United States Patent
Ludvig et al.

(10) Patent No.: US 7,996,459 B2
(45) Date of Patent: Aug. 9, 2011

(54) VIDEO-SWITCHED DELIVERY OF MEDIA CONTENT USING AN ESTABLISHED MEDIA-DELIVERY INFRASTRUCTURE

(75) Inventors: Edward A. Ludvig, Redwood City, CA (US); John P. Comito, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 11/469,425

(22) Filed: Aug. 31, 2006

(65) Prior Publication Data
US 2008/0059646 A1    Mar. 6, 2008

(51) Int. Cl.
G06F 15/16    (2006.01)
(52) U.S. Cl. .................................................. 709/203
(58) Field of Classification Search .................. 709/203, 709/231; 725/41, 118
See application file for complete search history.

(56) References Cited

U.S. PATENT DOCUMENTS

| | | | |
|---|---|---|---|
| 4,573,072 A | 2/1986 | Freeman | |
| 5,812,928 A * | 9/1998 | Watson et al. | 725/118 |
| 5,982,411 A | 11/1999 | Eyer et al. | |
| 6,005,597 A | 12/1999 | Barrett et al. | |
| 6,065,061 A | 5/2000 | Blahut et al. | |
| 6,188,871 B1 | 2/2001 | Kitamura et al. | |
| 6,243,145 B1 | 6/2001 | Schlarb et al. | |
| 6,714,545 B1 | 3/2004 | Hugenberg et al. | |
| 6,920,185 B2 * | 7/2005 | Hinson | 375/295 |
| 7,373,650 B1 * | 5/2008 | Rodriguez et al. | 725/41 |
| 2002/0099790 A1 | 7/2002 | Mosher et al. | |
| 2002/0108119 A1 | 8/2002 | Mao et al. | |
| 2002/0129374 A1 | 9/2002 | Freeman et al. | |
| 2003/0097661 A1 | 5/2003 | Li et al. | |
| 2003/0217365 A1 | 11/2003 | Caputo | |
| 2004/0133626 A1 * | 7/2004 | Herrero et al. | 709/200 |
| 2005/0028206 A1 | 2/2005 | Cameron et al. | |
| 2005/0038904 A1 | 2/2005 | Dougall | |
| 2005/0055728 A1 | 3/2005 | Gardes et al. | |
| 2006/0075428 A1 | 4/2006 | Farmer et al. | |
| 2006/0098669 A1 * | 5/2006 | Enns et al. | 370/401 |
| 2006/0117342 A1 | 6/2006 | Park et al. | |
| 2006/0174269 A1 * | 8/2006 | Hansen-Turton | 725/39 |

FOREIGN PATENT DOCUMENTS

| | | |
|---|---|---|
| EP | 0838933 | 4/1998 |
| WO | WO2006003543 | 1/2006 |

OTHER PUBLICATIONS

Altgeld, et al., "The IPTV/VoD Challenge—Upcoming Business Models," IBM Paper for the International Engineering Consortium (IEC), available at <<http://www-03.ibm.com/industries/media/doc/content/bin/VoDIPTVWhitepaperv2AltgeldZeeman_1.pdf, pp. 1-18.

(Continued)

*Primary Examiner* — Kyung-Hye Shin
(74) *Attorney, Agent, or Firm* — Lee & Hayes, PLLC

(57) ABSTRACT

A strategy is described for delivering media content to clients using a combination of switched media technology and established broadcast delivery technology (such as HFC technology). The strategy is advantageous because it provides the benefits of switched media environment without requiring significant revision to the established delivery infrastructure. The strategy includes a first version in which channels are not shared among clients, and a second version in which channels may be shared among clients which are accessing the same media content.

17 Claims, 14 Drawing Sheets

OTHER PUBLICATIONS

Dan, et al., "Channel Allocation Under Batching and VCR Control in Video-on-Demand Systems," summary available at <<http://cat.inist.fr/?aModele=afficheN&cpsidt=2971078>>, accessed Jun. 21, 2006, 2 pages.

Dan, et al., "Scheduling Policies for an On-Demand Video Server with Batching," Multimedia 94, Oct. 1994, San Francisco, California, 1994 ACM, pp. 15-23.

Dutta-Roy, "Cable: It's Not Just for TV," IEEE Spectrum, available at <<http://ieeexplore.ieee.org/iel5/6/16538/00763204.pdf?isNumber>>, 1999, pp. 53-59.

Hernandez-Valencia, "Architectures for Broadband Residential IP Services Over CATV Networks," IEEE Network, available at <<http://ieeexplore.ieee.org/iel3/65/12332/00567567.pdf?isNumber=&htry=6>>, Jan./Feb. 1997, pp. 36-43.

Tseng, et al., "Seamless Channel Transition for the Staircase Video Broadcasting Scheme," IEEE/ACM Transactions on Networking, vol. 12, No. 3, Jun. 2004, pp. 559-571.

Wall, "An Advanced Video Platform for the Cable Industry," available at <<http://ieeexplore.ieee.org/iel3/4967/13658/00629953.pdf?isNumber>>, 1997, pp. 31-33.

* cited by examiner

VIDEO-SWITCHED DELIVERY OF MEDIA CONTENT USING AN ESTABLISHED MEDIA-DELIVERY INFRASTRUCTURE

BACKGROUND

FIG. 1 shows features of a conventional cable distribution system 100. The system 100 includes a head-end center 102 that receives media content from one or more information sources 104. The head-end center 102 forwards the media content to a plurality of clients (such as exemplary client 106) via a cable distribution infrastructure 108. The cable distribution infrastructure 108 may deliver the media content through a coaxial cable infrastructure. Alternatively, in a hybrid case, the cable distribution infrastructure 108 may deliver the media content through a combination of fiber-optic infrastructure and coaxial cable infrastructure. This hybrid solution is referred to as a Hybrid Fiber Coax (HFC) system. Although not shown, the cable distribution infrastructure 108 may also conventionally adopt a distributed architecture by including a plurality of distribution nodes. As to the client-side part of the system 100, the client 106 may include a set-top box 110 for receiving and processing the media content. The set-top box 110 supplies processed media content to a presentation unit 112 (such as a television set) for output to a user.

In one well known approach, the system 100 delivers media content (such as television programs) over a plurality of channels. For example, the system 100 may conventionally partition an assigned range of frequencies into a plurality of channels. In the U.S., 6 MHz-wide frequency segments may be used, with each segment being separated from its neighboring segments by 6 MHz. The system 100 can then transmit different media content over these respective 6 MHz segments.

More specifically, bandwidth excerpt 114 shows a known manner in which the system 100 may allocate channels within an available range of frequencies. As shown, the system 100 may allocate a lower-frequency portion of the available bandwidth to transmitting a series of analog channels. The system may allocate a higher-frequency portion of the bandwidth for transmitting a series of digital channels. In the analog portion of the spectrum, each 6 MHz segment of bandwidth corresponds to a single channel. In the digital portion of the spectrum, each 6 MHz segment of bandwidth can carry plural channels. The head-end center 102 can multiplex together digital channels into a single transport stream. In the case of the digital channels, the head-end center 102 commonly uses quadrature amplitude modulation (QAM) to modulate media content for transmission over the cable infrastructure 108. More specifically, the head-end center 102 can multiplex together a plurality of digital channels into a single transport stream and convey these channels over a QAM signal on a 6 MHz carrier.

In operation, a user generates a channel tune event in conventional fashion, e.g., by selecting a channel with a remote control device (not shown). In response, the set-top box 110 uses a tuner 116 to selectively extract desired media content from one of the channels. The tuner 116 performs this task by adjusting a band pass filter such that content delivered over an identified frequency is selectively extracted from a received broadcast signal. FIG. 1 represents this tuning behavior using a double-headed arrow 118, where the double-headed arrow 118 denotes that the tuner 116 effectively moves along the frequency spectrum to extract desired information from the received broadcast signal. In the case of digital channels, the set-top box 110 also employs a demultiplexer (not shown) to extract the desired channel from the multiplex of digital channels.

FIG. 2 shows the operation of the system 100 in a different manner. Namely, this figure shows that four streams of media content, i.e., A, B, C, and D, are assigned to four different channels, W, X, Y, and Z. The tuner 116 selects desired media content by moving its band pass filter to extract a desired segment of the frequency spectrum.

The above-described type of conventional system 100 has enjoyed substantial success over the years, as evidenced by a large population of users who currently subscribe to this kind of service. At the same time, the market has also seen the significant growth of computer-based systems for delivering content to users over packet-based networks. The Internet represents the most dramatic example of such technology. Computer-based systems offer the promise of providing services that surpass traditional cable systems in terms of versatility, complexity, user-interactivity, and so on.

Computer-based systems may use a different delivery paradigm than the communication model described above. Namely, a typical computer-based system may employ a unicast mode to deliver content. In this mode, an information source delivers a media content item to a particular user over a dedicated communication coupling. For example, consider the case of a user who relies on a dial-up or digital subscriber line (DSL) connection to receive media content from an Internet-accessible source. This user may connect to the source over a dedicated communication socket in conjunction with a dedicated telephone line into the user's home. In contrast, as described above, the system 100 performs client-side selection to extract a portion of a broadcast signal.

To avoid losing market share, the cable industry is actively looking for ways to address the growing popularity of computer-based media delivery systems. As appreciated by the present inventors, the cable industry has invested substantial amounts of financial and technical resources in cable infrastructures, making it difficult to simply abandon this technology in favor of Internet-based models.

SUMMARY

A strategy is described for delivering media content to clients using a combination of switched media technology and established cable delivery technology (or other type of established media delivery technology). The strategy is advantageous because it provides the benefits of a switched media environment without requiring significant revision to the cable delivery infrastructure. The strategy includes a first version in which channels are not shared among clients. The strategy includes a second version in which channels may be shared among clients which are accessing the same media content.

In the non-shared version of the strategy, the client is tuned to a fixed channel. In response to a tune event, the client sends a request for desired content to an operations center, which prompts the operations center to route the desired content to the client via the fixed channel. In one implementation of the shared version, the content-requesting client first accesses a discovery table to determine whether any other client is currently receiving the desired content. If another client is receiving the content, the content-requesting client device identifies the channel over which the other client is receiving the desired content, and then also tunes to this channel. If another client is not receiving the content, the content-requesting client sends a request to the operations center as in the first version of the strategy.

This Summary section refers to exemplary and non-limiting manifestations of the subject matter described herein, and hence does not limit the scope of the invention set forth in the claims section.

Figure 1:
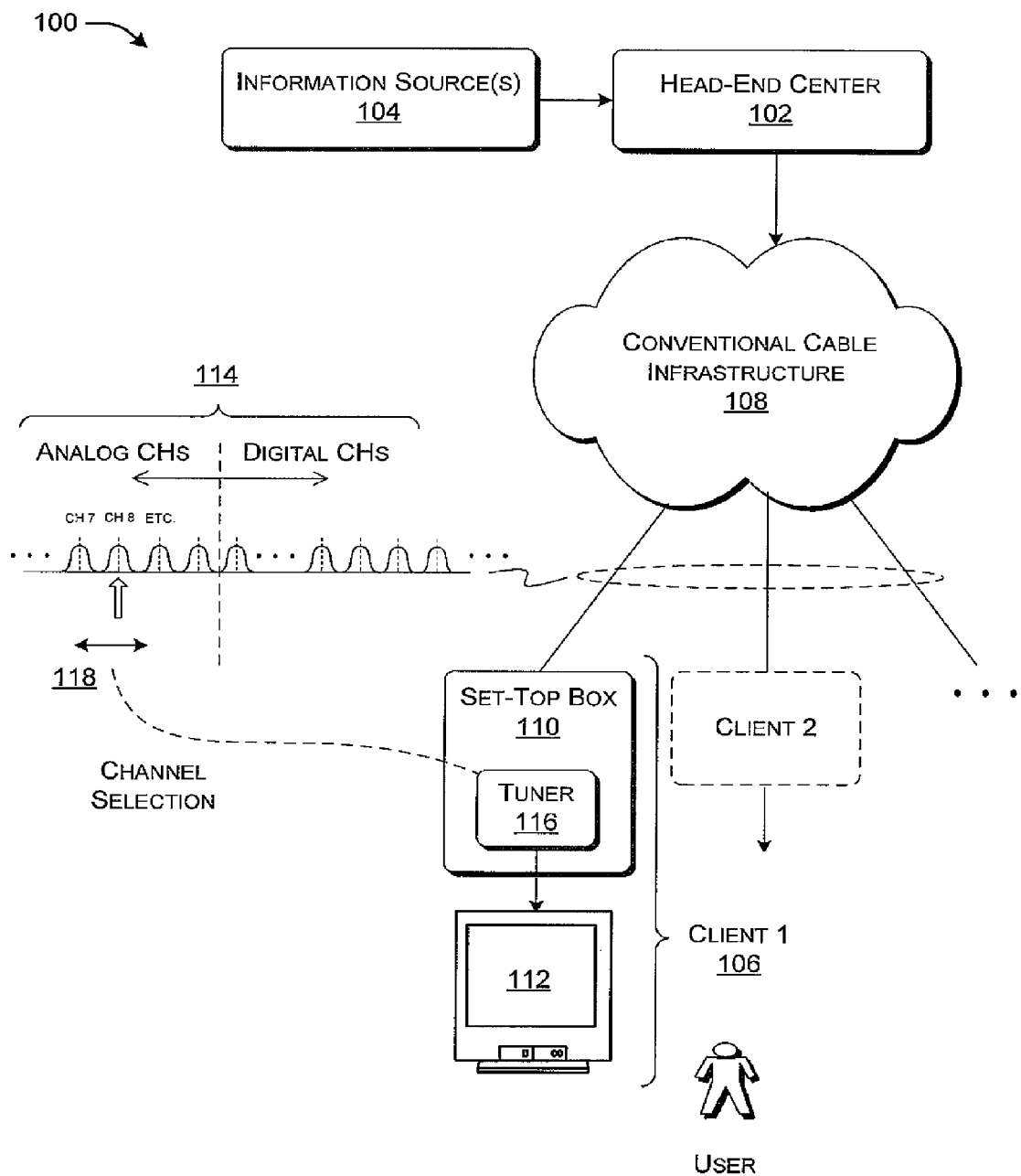
FIG. 1 shows a known system for delivering media content to clients.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for delivering media content to clients using a media-switching backend infrastructure in combination with a largely pre-established frontend communication infrastructure. To facilitate discussion, the media-switching backend infrastructure is described as an Internet Protocol-type system for switching media content to dedicated channels. The pre-established frontend communication infrastructure is described as a hybrid fiber coax (HFC) infrastructure, including various distribution nodes, fiber communication links, coaxial cable communication links, and set-top boxes. However, the strategy described herein can be applied to other implementations of the backend and frontend infrastructures.

The term "media content" encompasses any kind of information, including video content, still picture content, audio content, and so forth. This disclosure identifies a specific unit of media content, such as a television program or movie, as a "media item."

The term "channel" refers to a portion of a communication bandwidth devoted to conveying media content. For example, although not limited thereto, a channel may refer to any analog or digital channel that has traditionally been used to carry content over a cable communication system.

The disclosure includes the following sections: Section A sets forth exemplary systems for implementing the hybrid media delivery strategy summarized above. Section B describes exemplary procedures which explain the operation of the systems of Section A. Both sections describe non-shared and shared implementations of the strategy. In the non-shared implementation, the backend infrastructure routes media content to respective clients over dedicated channels associated with the channels. In the non-shared model, two or more clients may receive the same media content over different channels at any given time. In the shared model, the backend infrastructure may route the same media content to two or more clients using a single channel.

A. Exemplary System

As a preliminary matter, any of the functions described with reference to the figures can be implemented using software, firmware, hardware (e.g., fixed logic circuitry), manual processing, or a combination of these implementations. The term "logic, "module" or "functionality" as used herein generally represents software, firmware, hardware, or a combination of software and hardware. For instance, in the case of a software implementation, the term "logic," "module," or "functionality" represents program code (or declarative content) that is configured to perform specified tasks when executed on a processing device or devices (e.g., CPU or CPUs). The program code can be stored in one or more computer readable media.

More generally, the illustrated separation of logic, modules and functionality into distinct units may reflect an actual physical grouping and allocation of such software, firmware, and/or hardware, or can correspond to a conceptual allocation of different tasks performed by a single software program, firmware program, and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

A.1. Exemplary System for Implementing Non-Shared Solution

Figure 3:
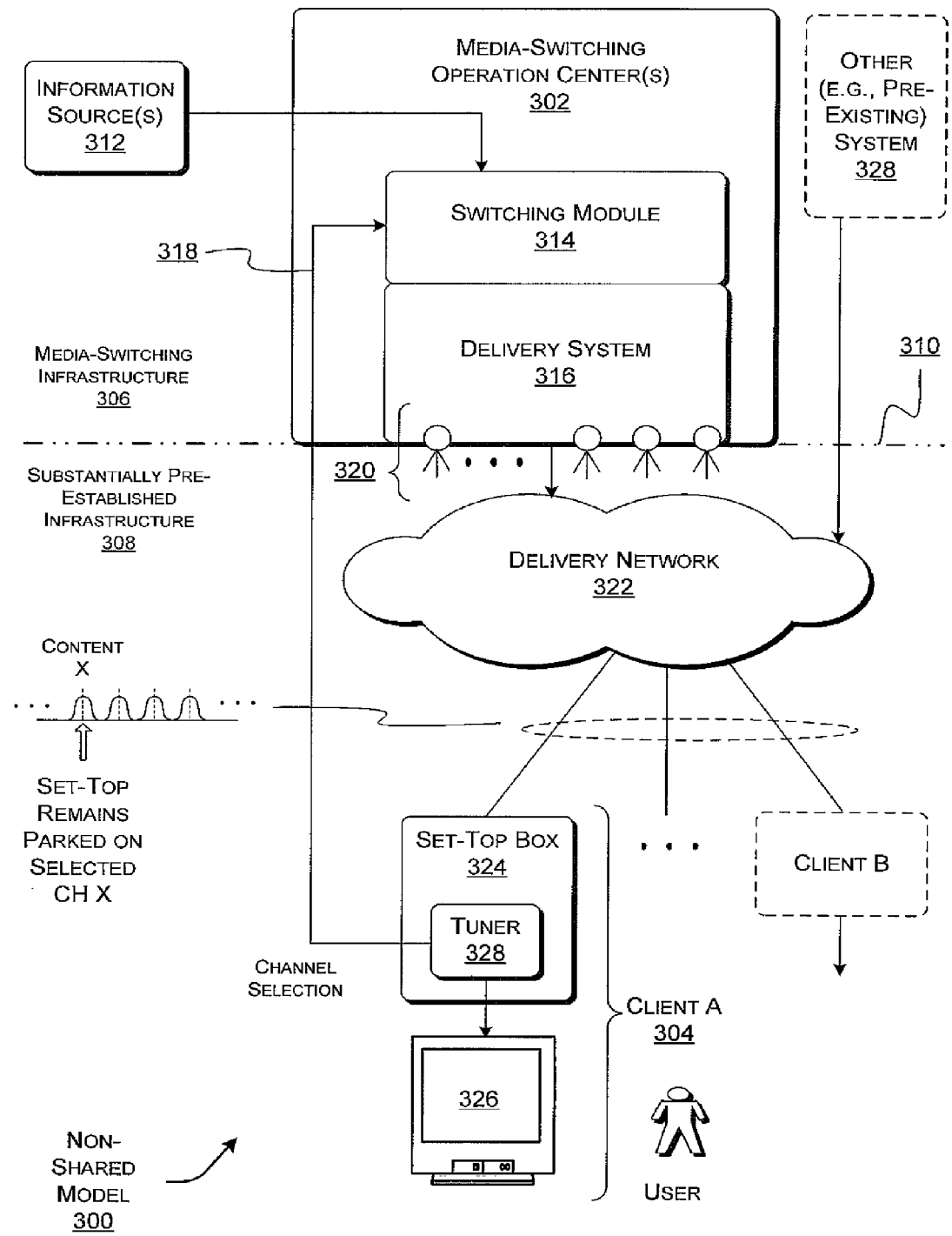
FIG. 3 shows an exemplary system for delivering media content to clients that combines a switched media backend infrastructure with a pre-established frontend infrastructure, where the system corresponds to a first non-shared-type implementation.

FIG. 3 shows a first system 300 for delivering media content from an operations center 302 to a plurality of clients, such as representative client 304. The system 300 adopts a non-shared solution, in which clients receive media content over respective dedicated channels. The operations center 302 sends content over the dedicated channels to the clients, even though two or more clients may be receiving the same media content (which explains the use of the qualifier of "non-shared" for this solution).

Viewing the system 300 on a general level first, it combines media switching infrastructure 306 and pre-established communication infrastructure 308. The media-switching infrastructure 306 pertains to backend infrastructure because it is associated with operations that are generally performed at the head-end side of the system 300. The pre-established communication infrastructure 308 pertains to frontend infrastructure because it is associated with operations that generally involve more direct interaction with the clients. A dashed line 310 loosely represents a separation between components that belong to the media-switching infrastructure 306 and other components that belong to the pre-established communication infrastructure 308.

The media-switching infrastructure 306 represents any technology that can receive client requests and, in response, direct media content to dedicated channels associated with the respective clients. In other words, this infrastructure 306 switches desired content to channels assigned to clients. In one non-limiting example, the media-switched infrastructure 306 can be implemented using Internet Protocol (IP) technology. The media-switching infrastructure 306 can represent IP technology that has been designed for use in another environment (such as an all-IP environment) and retooled for use in the system 300, or the infrastructure 306 can be specifically developed for use in the hybrid system 300.

The pre-established communication infrastructure 308 can correspond to any pre-established system for delivering media content to clients, such as a system traditionally designed for non-switched media delivery. One example of this kind of system is a conventional cable system composed entirely of coaxial cables, or a cable system composed of a combination of fiber optic cables and coaxial cables (to thereby provide a Hybrid Fiber Coax, i.e., HFC, solution). Other types of pre-established (non-switched) systems can include over-the-air terrestrial broadcast systems, satellite broadcast systems, and so forth.

The system 300 operates by assigning fixed channels to the clients. For example, in one implementation, the system 300 can assign a fixed channel to the client 304 during an initialization procedure, e.g., when this client 304 registers with the system 300 at boot time. The client 304 may remain tuned to this channel throughout a viewing session (or, potentially, over the course of multiple viewing sessions). In other implementations, the system 300 can assign (and/or re-assign) a channel to the client 304 in response to other events, including various post-initialization events. For example, the system 300 can re-assign another channel to the client 304 if a first-assigned channel becomes unavailable for any reason. In still other cases, the system 300 can more dynamically re-assign channels to the client 304 to economize the use of bandwidth, and/or based on any other consideration(s).

In response to a tune event generated by a particular client, the operations center 302 routes (or switches) the desired content to the channel associated with the particular client. A tune event may correspond to a user's manual instruction to change from first selected program content to second selected program content. For instance, a user can manually generate this instruction using a remote control device. Or a tune event may correspond to a machine-generated instruction to switch to particular program content. For example, a digital video recorder (DVR) device or video-on-demand (VOD) functionality can automatically generate this instruction. In any case, by virtue of the above-described switching operation, instead of asking the client to hunt for the desired content within a broadcast channel by performing client-side tuning to a desired channel, the operations center 302, at the head-end level, delivers the desired content to the client on the channel that the client is already tuned to.

One advantage of the system 300 is that it allows for the introduction of media-switching features without requiring the system 310 to significantly alter the non-switched parts of its infrastructure (namely, the pre-established infrastructure 308). This advantage is noteworthy because a provider may have invested large amounts of financial and technical resources in developing the pre-established infrastructure 308. Such technical resources may include fiber optic cables, coaxial cables, set-top boxes, node equipment, and forth.

Therefore, to frame the advantages in more concrete terms, the system 300 can provide switched media services to clients without "ripping up" and discarding a preexisting extensive cable infrastructure and without requiring users to replace their set-top boxes with IP-compatible set-top boxes.

As to the more fundamental question of why incorporate the use of media-switching features, there are several benefits to this technology. To cite one example, the use of a backend media-switching framework allows the system 300 to deliver content that is targeted to specific clients. For instance, this allows the system 300 to send content that is selected based on demographic considerations, context-based considerations, and/or other considerations. As to demographic targeting, the system 300 can send a video clip to a user based on the characteristics of a user, such as the user's gender, age, geographic location, etc. Other user-based considerations may relate to a pattern of behavior exhibited by the user, such as a pattern of media selection behavior. As to contextual targeting, the system 300 can send a video clip to the user because it is related to some other content that the user happens to be consuming at the time.

With the above introduction, the composition and operation of the system 300 will now be described in greater detail below. Beginning with the operations center 302, this component may receive media content from one or more information sources 312. The information sources 312 may include any supplier of media content, including one or more repositories of media content, one or more sources of live media content (e.g., associated with the live broadcast of a sporting event), one or more Internet-based sources of media content, and so forth. As noted above the media content can represent a collection of media items, such as television programs, movies, songs, and so forth. In a first viewing paradigm, the operations center 302 may deliver the media content in a collection of predefined program lineups, delivered over respective channels according to a defined schedule. In a second viewing paradigm, the operations center 302 may deliver the media content to users on an on-demand basis, that is, at times selected by users.

Figure 9:
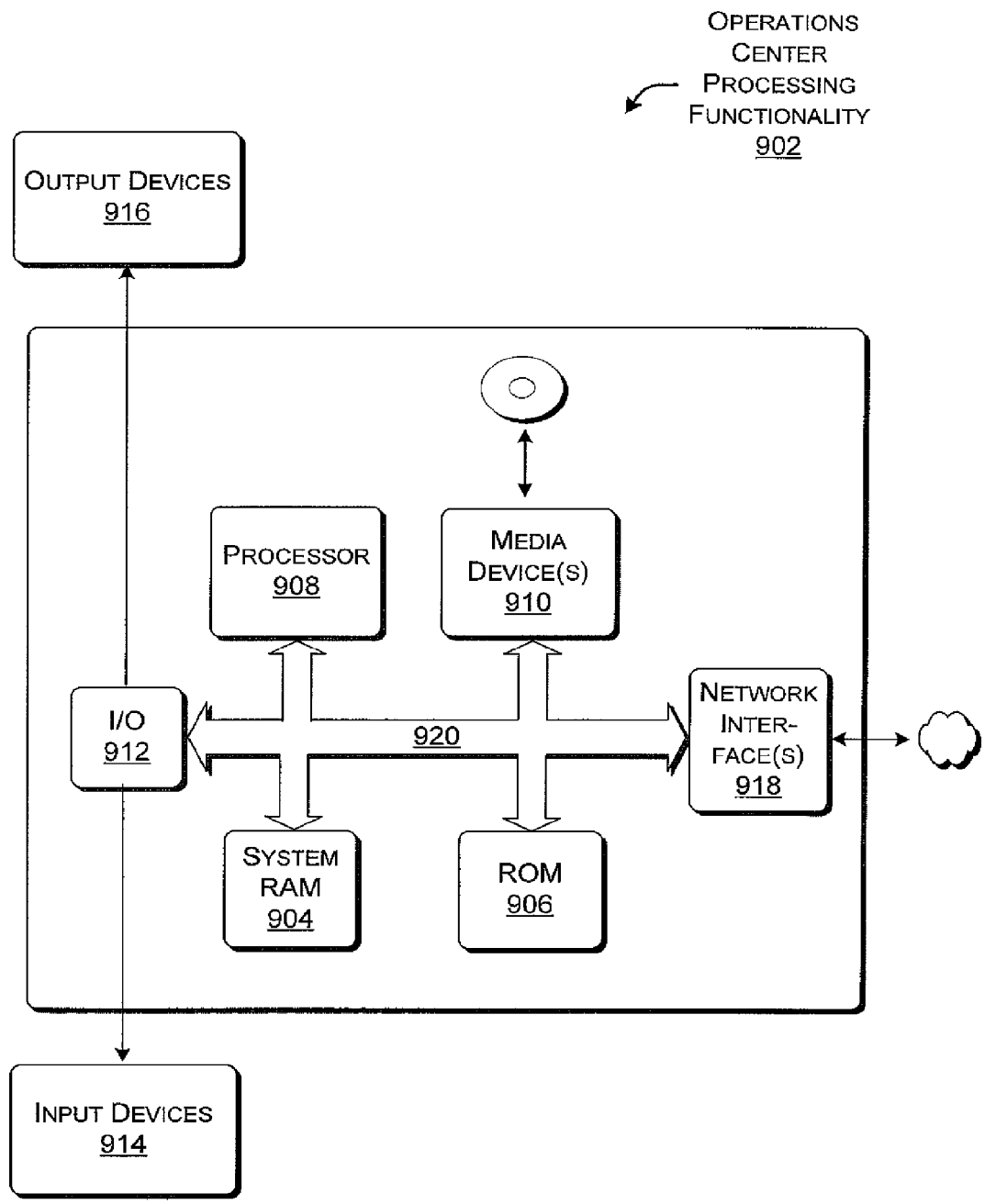
FIG. 9 shows exemplary processing functionality that can be used to implement any aspect of the operations centers of FIGS. 3 and 6.

The operations center 302 itself can be implemented as one or more components, located at a single site or distributed over plural sites. The components may include one or more server-type computers in association with other data handling equipment, such as switching mechanisms, storage devices, and so forth. FIG. 9, to be discussed below, shows an exemplary composition of a representative server-type computer.

The operations center 302 can include a switching module 314 and a delivery system 316. The purpose of the switching module 314 is to receive tune events from the clients, and, in response, switch desired content to assigned channels that the clients are respectively tuned to. The purpose of the delivery system 316 is to forward the media content to the clients via the clients' respective assigned channels. As to the use of the word "channels" here, the channels assigned to clients refer to pre-defined portions of the available frequency spectrum used to transmit media content. In the case of digital channels, each 6 MHz segment of bandwidth can support plural digital channels, such as, in one non-limiting case, about 8-10 channels. The operation center 302 can transmit these digital channels in multiplexed form.

Considering the switching module 314 in greater detail, the purpose of this module is to, as stated above, route desired media content to a client device's dedicated channel, so that the client device 304 can receive this content on the dedicated channel. For example, the user associated with client device 304 can make a content request, which prompts the client 304 to generate a tune event on coupling path 318. Assume, for example, that the user is watching a CNN network program and enters an instruction to switch to a FOX network program. Assume further that a channel X is assigned to the client 304 for receiving all content. The switching module 314 receives a corresponding tune event on path 318, and, in response, switches the desired content—namely, the FOX network program—to channel X. In other words, the switching module 314 changes the content being delivered over channel X from the CNN network program to the FOX network program. (Note that the above reference to a "dedicated channel" infers that the client 304 remains tuned to this channel over an extended period of time. For instance, the switching module 314 can assign this "dedicated channel" to the client 304 at the time of initialization. But in other cases, a "dedicated channel" may refer to a less stable client-to-channel assignment. For instance, the switching module 314 may re-assign another channel to the client 314 based on any consideration or combination of considerations. Accordingly, as used herein, the terms "dedicated," "assigned," "fixed," etc. are to be liberally and generally construed.)

The switching module 314 module can be implemented in various ways, such as by providing a switching fabric. The switching fabric, in turn, can be built from multiple multiplexers. Multiplexing functionality can be implemented as hardware, software or a combination of hardware and software.

The uplink path 318 can be implemented in various ways. In general, this path 318 can be implemented by the same mechanism used to transfer media content to the clients. For example, the path 318 can be implemented via an uplink cable path. Or this path 318 can be implemented by a path that is separate from the mechanism used to transfer media content to the clients. For example, the path 318 can be implemented as some special channel, such as a DOCCIS channel path. DOCCIS refers to an IP-based supplemental path used to exchange information in the context of a cable system. Still other strategies can be used to forward tune events to the switching module 314. In general, the uplink path 318 can represent an in-band return path or an out-of-band return path.

The purpose of the delivery system 316 is to, as stated above, forward identified media content to the clients. This operation may involve transforming the media content into an appropriate form for handling by the pre-established communication infrastructure 308. To provide a concrete example of this transformation, consider the exemplary case in which media content is originally encoded as multiple MPEG media streams. The delivery system 316 can multiplex multiple digital streams together to produce a transport stream. The delivery system 316 can then transform the transport stream into a form that is suitable for transmission over the pre-established communication infrastructure 308, such as by applying quadrature amplitude modulation (QAM) to the transport stream. The resultant stream can then be upconverted and sent out over the pre-established communication infrastructure 308. This juncture in the processing represents the end of data handling by the media-switching infrastructure 306 and the start of data handling by the pre-established communication infrastructure 308, otherwise known as the edge, represented by line 310.

The transformation may also involve removing IP-related formatting from the media content. That is, the media content received by the operations center 302 may be expressed in a format that is appropriate for handling by an IP-based system. For example, the MPEG streams may be encapsulated within the payloads of packets used to transmit information over an IP-based network. The delivery module 316 may transform this data to remove IP-related overhead, such as by stripping off header content associated with the IP formatting. This allows the pre-established communication infrastructure 308 to more readily consume the media content (because the pre-established communication infrastructure 308 may not have been initially designed to handle information expressed using IP-related formatting.) The removal of IP content can take place at any point (or at multiple points) prior to the edge, represented by line 310.

The delivery system 316 can be implemented as various components, implemented at a single site over distributed over plural sites. For example, in one case, a central delivery system 316 supplies media content to an entire population of clients. The central delivery system 316 can be implemented as one or more server-type computers in conjunction with other data processing equipment. In another case, the system 300 relies on plural nodes 320 to transmit the media content to respective groups of clients. For example, assume that a digital portion of a spectrum supports 800 digital channels, and therefore accommodates 800 clients. In this scenario, the nodes 320 can support respective groups of 800 clients. Using the node-based approach, the system 300 can scale to incorporate additional clients by adding additional nodes 320. Each node can be implemented by one or more server-type computers in cooperation with other data handling equipment.

Figure 2:
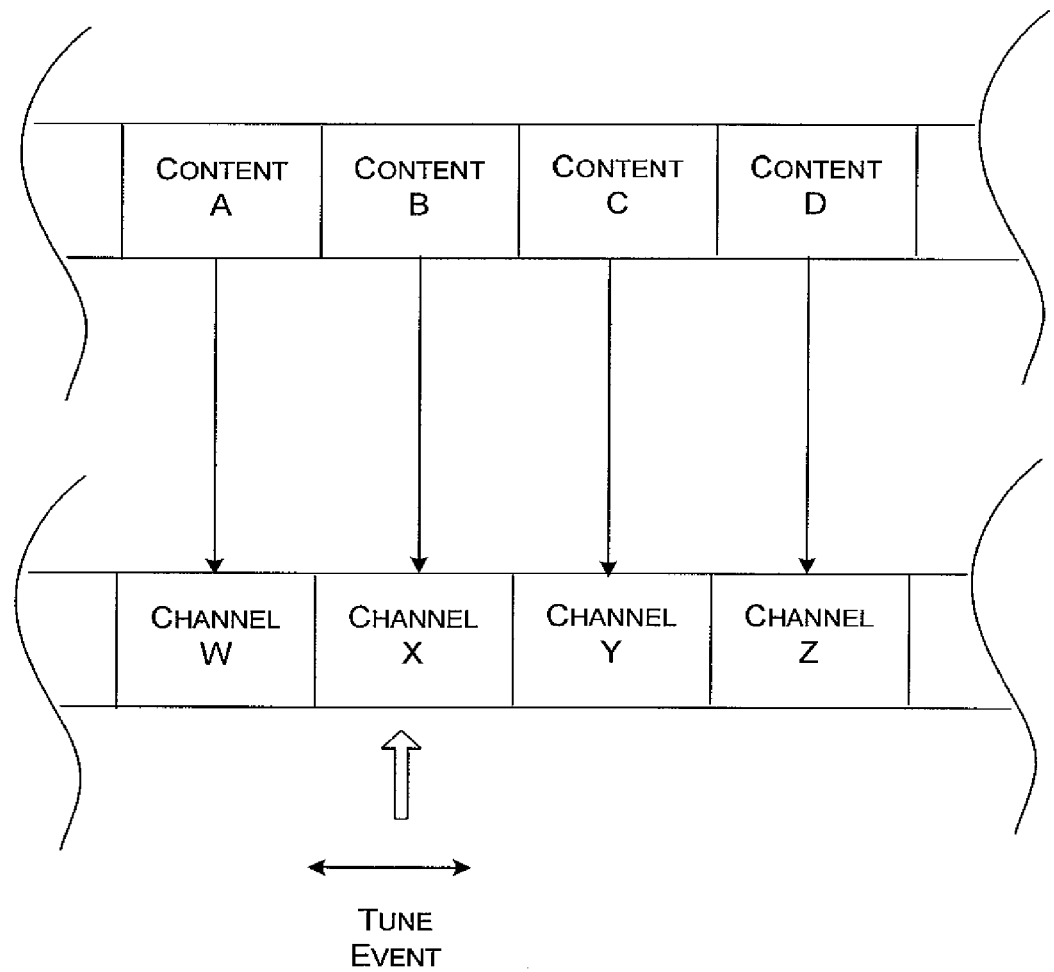
FIG. 2 shows a channel allocation and selection strategy employed by the system of FIG. 2.

Note that FIG. 1 illustrates the switching module 314, the delivery system 316, and the nodes 320 as forming an integrated processing block (by virtue of the fact that these elements are merged together in the figure). This signifies that the functions performed by these components can be organized in various ways. For example, in one case, a central operations center 302 can perform all switching operations in the system 316, and the nodes 320 can acts as intermediaries to forward the switched content to respective groups of clients. In another case, the switching operation performed by the switching module 314 can be performed in distributed fashion by the nodes 320. In this scenario, the nodes 320 serve as the loci for switching media content to respective clients over assigned channels.

Now turning to the pre-established communication infrastructure 308, this environment may include at least some functionality of the nodes 320, a pre-established delivery network 322, and a plurality of client devices, such as representative client 304. The delivery network 322 can include infrastructure that is entirely built using coaxial cables that terminate in respective users' homes (or other destinations). In another case, the delivery network 322 can include a combination of fiber optic cables and coaxial cables. For example, a conventional cable system may deliver media content to a certain point using fiber optic cables. From this point, the delivery network 322 can convey the media content using coaxial cables. Fiber optic cables are used in this kind of system because they offer superior signal-to-noise performance compared to coaxial cables, reduce the need for signal-boosting amplifiers, and so on. Still other implementations may rely on other communication links besides cable links. For instance, the delivery network 322 may represent an over-the-air conduit of media content, including various terrestrial antennae, etc.

The client devices can comprise any equipment for processing media content for output to users. The representative client 304 in FIG. 3 includes a set-top box 324 which receives media content from the delivery network 322, processes this media content, and outputs the processed media content to a presentation unit 326, such as a television set. The set-top box 324 includes a tuner 328. The purpose of the tuner 328 is to extract a predetermined channel from the signal received over the delivery network 322. As described above, the set-top box 324 can be programmatically configured so that the tuner 328 remains locked on a channel that is assigned to the client 326. In other words, rather than requiring the tuner 328 to hunt for the desired content on the received broadcast signal, the switching module 314 at the operations center 302 has already routed the desired content to the channel assigned to the client 304. The client 304 need only make a request for desired content and then receive this content over the assigned channel.

It warrants repeating that the set-top box 324 may have been initially developed to work solely within a pre-established communication infrastructure in which the tuner 328 is the active agent responsible for selecting desired content. In other words, the set-top box 324 may represent existing hardware provided by a cable company, originally designed to function in a traditional manner (described in connection with FIG. 1). By virtue of the combination of the media-switching infrastructure 306 with the pre-established communication infrastructure 308, the system 300 can provide media-switching features without abandoning the use of the existing set-top box 324. For instance, the existing set-top box 324 can be retained and modified to work in conjunction with the hybrid environment shown in FIG. 3. This modification can be achieved by adding a software patch to the set-top box 326. By reusing existing infrastructure in the manner described above, the system 300 can achieve substantial cost savings (as opposed to building an IP-compatible solution from "scratch"). That is, adopting an end-to-end IP solution may require replacing existing set-top boxes, as well as replacing network infrastructure that couples the edge 310 to the set-top boxes.

In one commercial environment, the system 300 can exclusively rely on the hybrid solution described above. In this case, every available channel is dedicated to the hybrid delivery paradigm described above.

In another commercial environment, the system 300 can provide plural solutions, such as the hybrid solution explained above in combination with at least one other solution. For instance, FIG. 3 shows that the operations center 302 that provides the hybrid solution can be used in conjunction with another delivery system 328 that provides some other solution. For example, the other delivery system 328 may provide functionality for transmitting media content in conventional fashion over respective analog channels in the lower part of the frequency spectrum. In this conventional mode, the client 304 can tune to one of these analog channels in conventional fashion by selecting an appropriate frequency.

Considered together, a client has the choice of accessing content via a single digital channel (in which switching is performed at the head-end in the higher part of the frequency spectrum), or accessing content in conventional fashion by performing client-side switching among a plurality of analog channels (in the lower part of the frequency spectrum). Such a hybrid solution may be desirable in some environments to facilitate the transition from a traditional mode of media delivery to the new (hybrid) mode of media delivery discussed above. Moreover, a migration strategy can be adopted whereby the traditional mode of delivery is progressively phased out in favor of the new mode of delivery. This can be performed by devoting decreasing amounts of spectrum for transmitting information according to the traditional paradigm.

Figure 4:
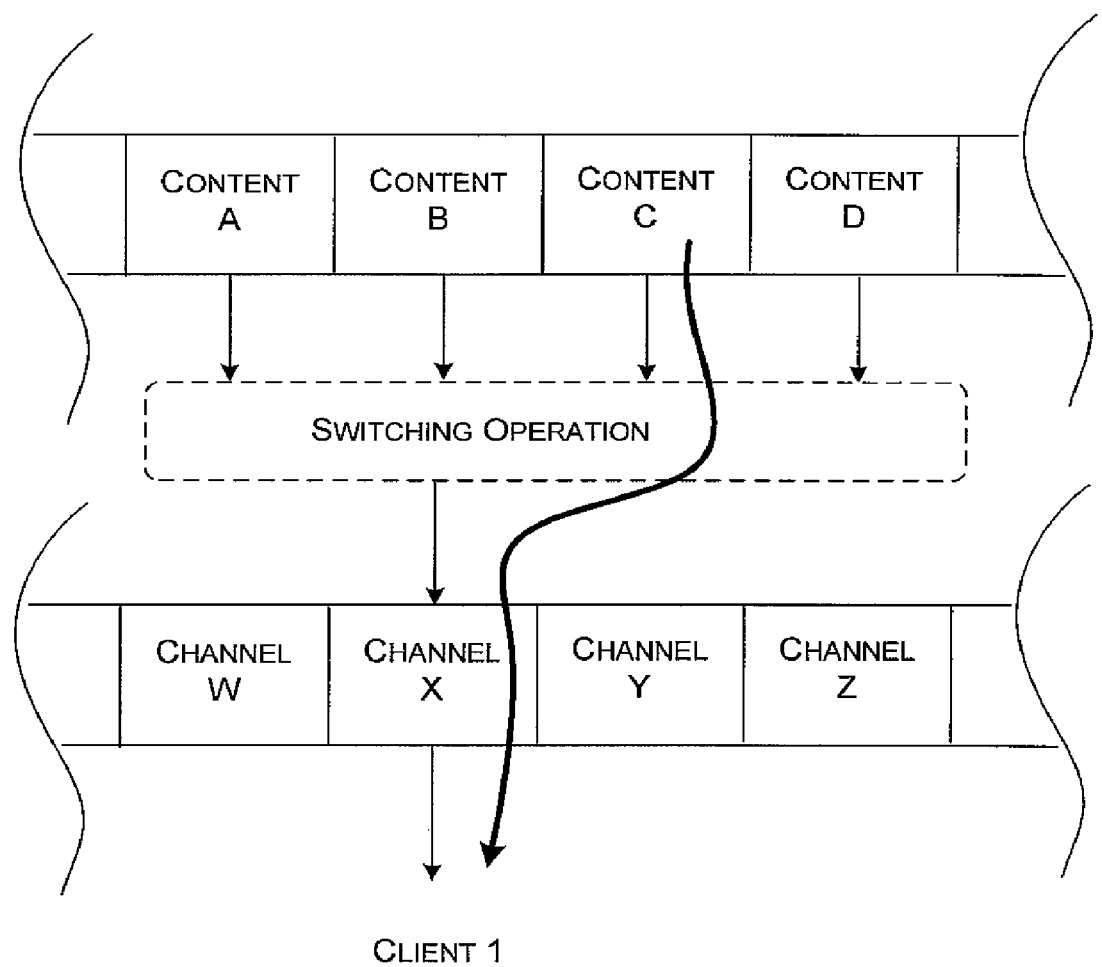
FIG. 4 shows an exemplary channel allocation and selection strategy employed by the system of FIG. 3.

FIG. 4 shows the operation of the system 300 in a different manner. Namely, this figure shows that four streams of media content, i.e., A, B, C, and D, are available for the user's selection. Assume that that the user selects media content corresponding to stream C. Further assume that the system 300 has pre-assigned channel X to the client 304, which enables the client 304 to receive all media content via channel X. In response to the user's selection, the operations center 302 performs server-side switching to route media content C to channel X. The user can then receive the media content C via channel X without having to perform a client-side tuning operation.

Figure 5:
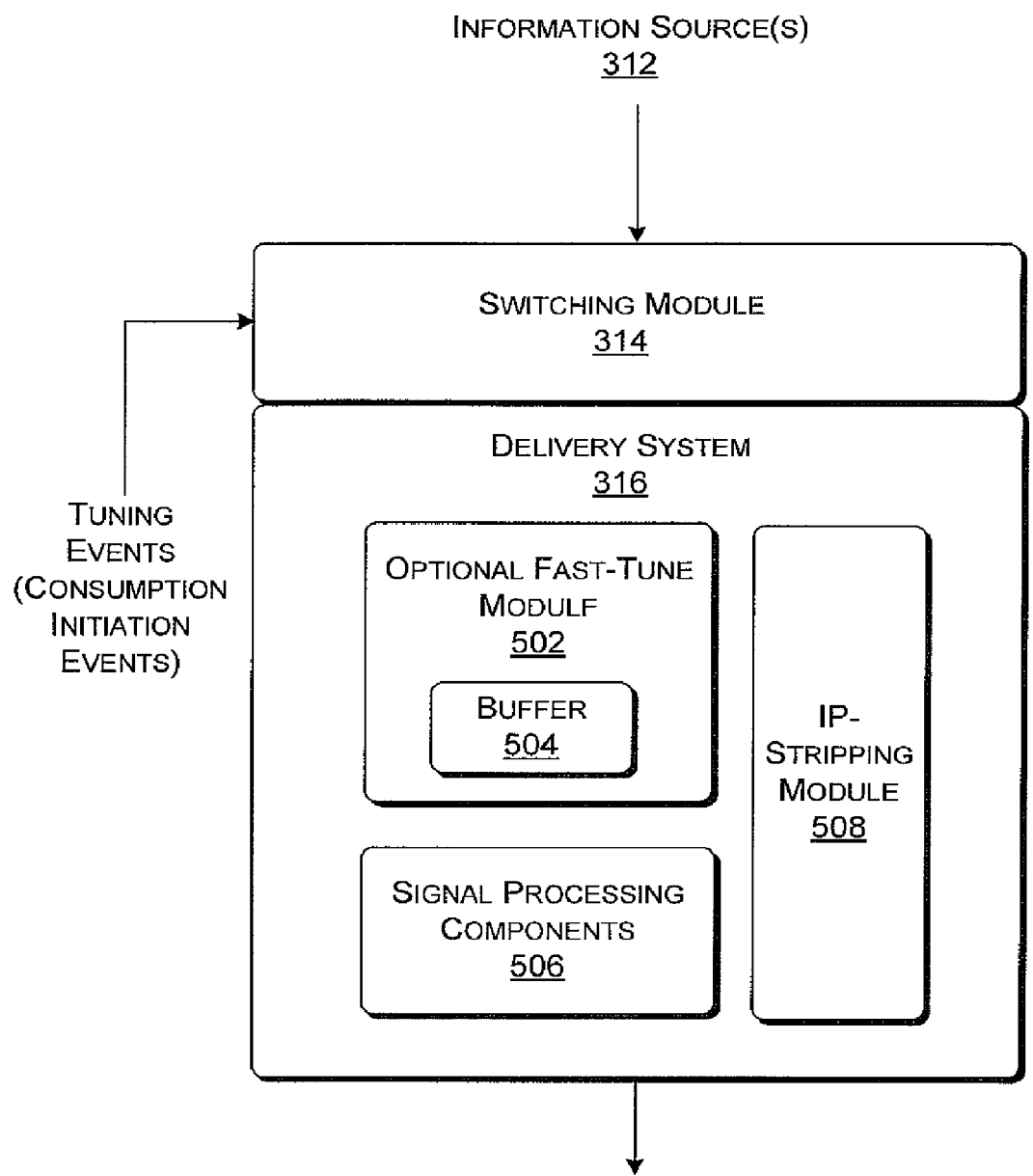
FIG. 5 shows exemplary components for use in an operations center of the system of FIG. 3.

FIG. 5 elaborates on one exemplary construction of the operations center 302. As explained above, the operations center 302 includes a switching module 314 and a delivery system 316. As stated, the purpose of the switching module 314 is to receive tune events from clients, and, in response, execute server-side switching of media content to channels associated with the clients.

More specifically, in a multi-node non-shared environment, the switching operation can include the following operations. First, when the user (or DVR, etc.) selects new media content, the client 304 registers a tune event. The client 304 sends the tune event to the switching module 314 via path 318. The switching module 314 routes the desired content to a channel associated with the client 304. More specifically, this switching operation can involve sending a switching instruction and associated media content to a node group to which the client 304 belongs. The node group can then perform a local (i.e., group-specific) switching operation by directing the desired media content to the client 304 over the channel assigned to the client 304.

As a special feature, the switching module 314 can record the media content that each client was last tuned to. When a client is turned on, the switching module 314 can attempt to provide the client with the same media content that it was tuned to when it was turned off. For example, assume that a client was tuned to the CNN network when it was turned off. The switching module 314 can attempt to supply the client with the same network content when it is turned back on.

The purpose of the delivery system 316 is to perform all tasks associated with readying the media content for delivery over the pre-established communication infrastructure 308.

As explained above, the functions performed by the switching module 314 and delivery system 316 can be integrated together or separated in any manner. Further, the functions can be performed at a single site or multiple distributed sites. To illustrate this versatility in implementation, FIG. 5 shows the switching module 314 as merged with the delivery system 316.

FIG. 5 also shows individual components within the delivery system 316. A first component is an optional fast-tune module 502. The purpose of the fast-tune module 502 is to accelerate the delivery of media content to the user when the user first tunes to media content. The fast-tune module 502 can perform this operation using any one (or more) of multiple different techniques. Further, although not shown in FIG. 5, the client 304 can optionally be also adapted to incorporate complementary client-side fast-tune functionality for expediting the delivery of media content upon a tune event.

To begin with, consider one of the causes of latency upon a channel tune event. In MPEG technology, the media content may be composed of a series of I frames interspersed with a series of predictive frames (e.g., B and P frames). The I frames represent complete "snapshots" of the media content, whereas the B and P frames represent delta frames which describe the current state of the media content with reference to a nearby I frame. The client 304 may be precluded from presenting MPEG data until it has received one or more I frames. For this reason, the client 304 may experience a short presentation lag when it first tunes to media content. Other processing responsibilities at the head-end and/or the client-site may contribute to channel change latency.

In one technique for ameliorating channel change latency, the delivery system 316 can maintain a buffer 504 for each media content item that can be delivered to the client device 304 at a given time. Assume, for example, that a user switches from media content item A to media content item B, where it is desired to present media content item B at time $t_{start}$. The buffer 504 can store a short segment of media content B spanning from $t_{start}$ to $t_{start} \pm t_0$, where $t_0$ may represents an offset of a few seconds. To expedite delivery of media content upon a channel tune event, the fast-tune module 302 can be configured to selectively extract one or more I frames from the buffer 504 and present this information first. This allows the client 304 to more quickly receive the I frame(s) and therefore more quickly begin decoding and rendering the media content.

Other strategies can be used to expedite the delivery of media content upon a tune event. In another case, the fast-tune module 302 can supply the media content at an accelerated bit rate for an initial period of time after the user switches to new media content. After this initial period, the fast-tune module 502 can settle to a nominal data rate. This provision allows the client 304 to more quickly receive media content after a channel change event has occurred.

Still other strategies for expediting the delivery of media content can be used. For example, any of the techniques described in the following co-pending and commonly assigned applications can be used:

Ser. No 10/218,674, entitled "Fast Digital Channel Changing," filed on Aug. 13, 2002, naming the inventors of Barrett et al.

Ser. No. 10/218,675, entitled "Seamless Digital Channel Changing," filed on Aug. 13, 2002, naming the inventors of Barrett et al.

Ser. No. 10/460,949, entitled "Fast Start-up for Digital Video Streams," filed on Jun. 13, 2003, naming the inventors of Baldwin et al.

Ser. No. 10/683,132, entitled "Media Stream Scheduling for Hiccup-Free Fast-Channel-Change in the Presence of Network Chokepoints," filed on Oct. 10, 2003, naming the inventor of Dustin Green.

Ser. No. 10/684,138, entitled "Fast Channel Change," filed on Oct. 10, 2003, naming the inventors of Barrett et al.

Ser. No. 10/789,128, entitled "Media Stream Splicer," filed on Feb. 27, 2004, naming the inventors of Green et al.

Ser. No. 11/010,200, entitled "Accelerated Channel Change in Rate-Limited Environments," filed Dec. 10, 2004, naming the inventors of Geoffrey R. Smith et al.

Ser. No. 11/010,200, entitled "Accelerated Channel Change in Rate-Limited Environments," filed Dec. 10, 2004, naming the inventors of Geoffrey R. Smith et al.

Ser. No. 11/292,298, entitled "Accelerated Channel Change," filed on Nov. 30, 2005, naming the inventors of Cuijpers et al.

A signal processing component 506 transforms the media content into a form for transmission over the pre-existing communication infrastructure 308. As explained above, this operation can comprise a series of operations, performed in a specified order. In one exemplary case, the operations can involve multiplexing elementary streams together to produce a transport stream, modulating the transport stream using QAM, up-converting the transport stream, and so forth. The order in which these operations are performed may vary. Further, additional operations can be used to transform the media content, and/or any one or more of the above-identified operations can be omitted.

An IP-stripping module 508 performs the task of optionally removing IP-related header information and other formatting from the media content. As explained above, this transforms the media content from a form that is best suited for processing by the media-switching in infrastructure 306 into a form that is best suited for processing by the pre-established communication infrastructure 308. The IP-stripping module 508 is drawn in FIG. 5 in a manner that spans the other components in the delivery system 316 to graphically indicate that this functionality can be performed at various stages of processing performed by the delivery system 316.

A.2. Exemplary System for Implementing Shared Solution

Figure 6:
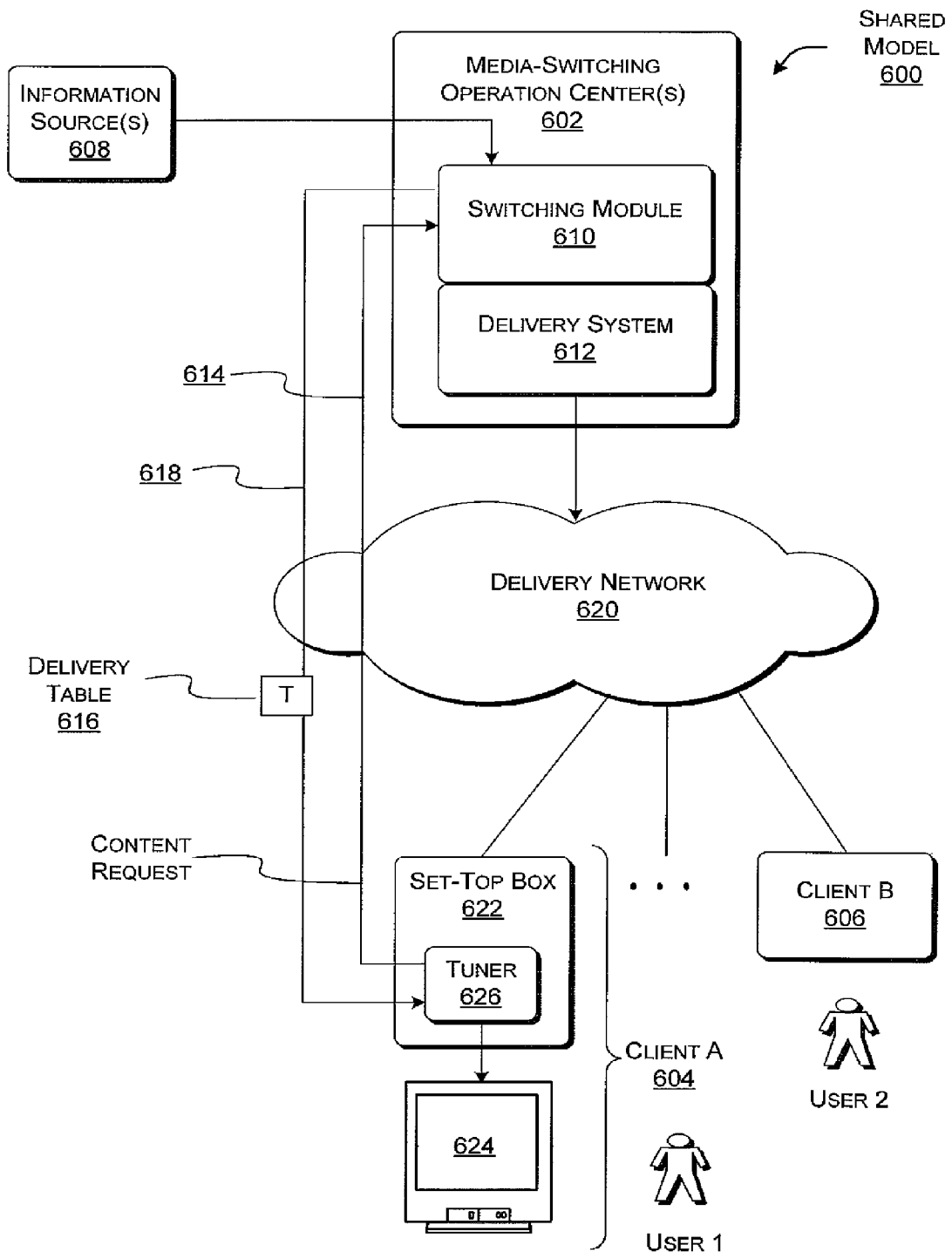
FIG. 6 shows an exemplary variation of the system shown in FIG. 3, wherein the system of FIG. 6 corresponds to a second shared-type implementation.

FIG. 6 shows a second system 300 for delivering media content from an operations center 602 to a plurality of clients, such as representative client A 604. The system 600 adopts a shared solution. In the shared solution, the operations center 602, in the event that two or more clients happen to be consuming the same media content, the system 600 can allow these clients to tune to the same channel that carries this media content. In other words, whereas the first solution may dedicate separate channels to clients even though these clients may be receiving the same media content, the second solution reduces redundancy by allowing these clients to tune to the same channel. This redundancy-reducing feature is desirable because it potentially frees up available bandwidth, allowing the system 600 to provide more enhanced services. (In more general terms, this redundancy-reducing feature can be invoked on behalf of a client when it is determined that the client's node group has already dedicated a channel to provide the content that the client wishes to receive, that is, regardless of whether another client within the node group happens to be actually consuming the desired content at the time.)

In one implementation, the second solution adopts certain features of the first solution. That is, like the first solution, a client can receive head-end switched media content over a pre-assigned "default" channel. But if the client determines that another client is already receiving desired content, then the client can switch away from its default pre-assigned channel and tune to the channel that the other client is tuned to. When the client again requests content that no other client is currently tuned to, it can optionally return to its default pre-assigned channel to receive this desired content. In another implementation of the second solution, unlike the first solution, the system 600 need not allocate dedicated "home" channels to clients. Rather, the system 600 can allocate channels to clients on a first-come-first serve basis, and/or based on any other considerations.

To provide a more concrete example, assume that client A 604 first tunes to a FOX network program. If no other client happens to be consuming this program at the time, then the system 600 may switch the FOX program to a channel associated with client A 604. Assume that this channel is a hypothetical channel Y. Channel Y may be client A 604's default "home" channel (as in the first solution), or a channel that is assigned to client A 604 based on some other consideration. At this point, this operation is the same procedure performed in the first solution; namely, the switching is performed at the operations center 602, thereby avoiding the need for the client A 604 to perform client-side tuning to the desired media content.

Next assume that a second client, e.g., client B 606, requests delivery of the same FOX network program. In response, the system 600 instructs the second client B 606 to tune to the same channel (Y) over which the first client A 604 is currently receiving this media content. In this case, even though the second client B 606 may have its own default dedicated channel (say, channel X), the system 600 instructs client B 606 to perform client-side tuning to access the FOX program on channel Y. However, had the order of events been reversed, where client B 606 was the first to access the FOX network program, then the system 600 may have delivered the content over channel X to client B 606. The system 600 may have then instructed client A 604 to tune to channel X to access the same FOX program. By virtue of the ability to share content among multiple clients, the system 600 provides a multicasting solution using a cable frontend.

Now considering the system 600 in greater detail, it includes the same basic components as the first system 600, with various exceptions to be noted below. Namely, the system as a whole is divided between media-switching infrastructure and pre-established communication infrastructure in the same manner as the first solution (although, to simplify the illustration, these features are not specifically labeled in FIG. 6). An "edge" of the system 600 defines a transition from the media-switching infrastructure to the pre-established communication infrastructure. By virtue of its combination of a media-switching backend with a pre-established communication frontend, the system 600 incorporates all of the advantages of the first solution of FIG. 3.

Also like the first solution, the operations center 602 receives media content from one or more information sources 608. The operations center 602 itself can include a switching module 610 and a delivery system 626. The purpose of the switching module 610 is to a receive tune events from the clients via path 614, and, in response, switch desired media content to the clients, providing that no other client is receiving the same media content at the time. As will be discussed more fully below, the switching module 610 also manages bandwidth for the clients as a group, releasing bandwidth that is not currently being used by any client so that it can be reused. Finally, the switching module 610 maintains a discovery table that describes the current content usage among clients. In one exemplary implementation, the switching module 610 sends this discovery table 616 down to the clients via path 618. As will be discussed, a client can then locally access this discovery table 616 to determine whether, upon a tune event, it should request the desired media content from the operations center 602, or simply tune to a channel that is already being used by the operations center 602 to provide the desired media content to one or more other clients. This method reduces the use of upstream bandwidth, since a client can verify the presence of requested content without propagating a tune event on the backchannel.

The uplink path 614 can be implemented in various ways. In one case, this path 614 can be implemented by the same mechanism used to transfer media content to the clients. For example, the path 614 can be implemented via an uplink cable path. In another case, the uplink path 614 can be implemented by a path that uses a different mechanism than the media content path. For example, the path 614 can be implemented as some special channel, such as a DOCCIS channel path. As stated above, DOCCIS refers to an IP-based supplemental path used to exchange information in a cable system. In general, the uplink path 614 can represent an in-band return path or an out-of-band return path.

The downlink path 618 can also be implemented in various ways, such as a cable path or a non-cable path. For example, the discovery table 616 can be communicated on an out-of-band channel that the client traditionally uses to receive supplemental information, such as electronic program guide (EPG) data. Or the switching module 610 can transmit the discovery table 616 using the above-described DOCCIS channel path. Still other routing mechanisms are possible.

The purpose of the delivery system 316 is to forward the media content to the clients. The delivery system 316 functions substantially in the same manner described above with respect to the first solution. That is, it may include multiplexing functionality, QAM-converting functionality, up-converting functionality, IP-stripping functionality, and so forth.

Like the case of FIG. 3, the system 600 can distribute the processing responsibility of the operations center 602 among plural nodes, although not shown in the context of FIG. 6.

The media content (and optionally also the information transferred via paths 614 and 616) can be passed over a delivery network 620. Like the case of FIG. 3, this delivery network 620 can include infrastructure that is entirely built using coaxial cables that terminate in respective users' homes (or other destinations). In another case, the delivery network 620 can include a combination of fiber optic cables and coaxial cables (to provide an HFC solution). Still other implementations may rely on other communication links besides cable links. For instance, the delivery network 620 may represent an over-the-air conduit of media content, including various terrestrial antennae, etc.

The client devices can comprise any equipment for processing media content for output to users. The representative client A 604 in FIG. 6 includes a set-top box 622 which receives media content from the delivery network 620, processes this media content, and outputs the processed media content to a presentation unit 624, such as a television set. The set-top box 622 includes a tuner 626. The purpose of the tuner 626 is to extract a predetermined channel from the signal received over the delivery network 620.

The role of the clients in selecting desired content will now be set forth in greater detail, with reference to exemplary client A 604 and client B 606. Assume first that client A 604 is the first to request particular media content, meaning that no other client is currently receiving this content. Recall that the client A 604, like all clients, has previously received a discovery table 616. At the time of a content selection event, the client A 604 accesses the discovery table 616 to determine if any other client in client A's node group is currently receiving the desired content (or, more generally, whether the node group is currently configured to furnish the desired content over a particular channel). This inquiry will be answered in the negative in this particular scenario. In response, the client A 604 then sends a request via path 614 to the operations center 602, requesting the operations center 602 to switch the desired content to the client A 604. The functioning of the system 600 from this point on may resemble the operation of the non-shared solution of FIG. 3. Namely, presuming that the client A 604 has a pre-allocated channel on which it is already tuned to, the operations center 602 may perform a server-side switching operation to route the desired media content to the client's dedicated channel, thereby avoiding the need for the client A 604 to hunt for this content is by performing a client-side tuning operation.

However, in other implementations, as will be discussed more fully below, the switching module 610 may take a more liberal role in allocating bandwidth to different clients, so as to render channel usage more efficient. For example, the switching module 610 may determine that client A 604 is not using its allocated channel. To make more efficient use of bandwidth, the switching module 610 may allocate this channel to another client. In this case, when the client A 604 actually needs it dedicated channel, it may not be available, requiring that it tune to another channel. As can be appreciated by one skilled in the art, the switching module 610 can adopt a number of bandwidth management solutions to govern bandwidth usage, adopting any number of specific rules.

Continuing the example described above, next assume that, in the alternative, client B 606 is currently consumed the desired media content when the user of client A 604 requests this content. In this case, the client A 604 will discover client B's 606 usage when it consults the discovery table 616. Client A 604 can also discover the channel over which client B is currently receiving the desired content. In response, client A 604 can perform a local tuning operation to tune to the same channel that client B 606 is receiving the desired content. This provision avoids the needs for the switching module 610 to use additional bandwidth to redundantly transmit the desired content to both client A 604 and client B 606.

Although not shown in FIG. 6, the solution shown in FIG. 6 can adopt a migration strategy in which the delivery paradigm described above is combined, at least temporarily, with one or more traditional delivery solution(s). This gives different clients the opportunity to rely on the unique solution described above or a traditional solution.

Figure 7:
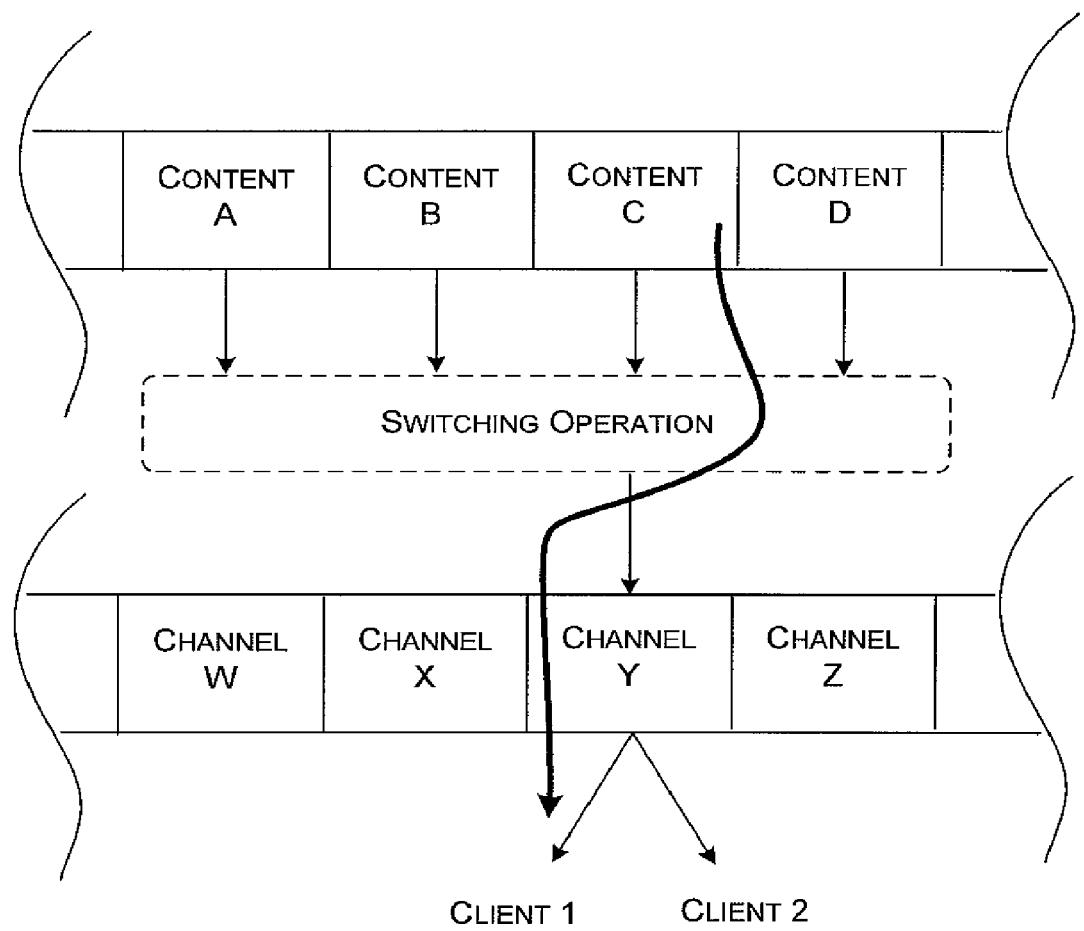
FIG. 7 shows an exemplary channel allocation and selection strategy employed by the system of FIG. 6.

FIG. 7 shows the operation of the system 600 in a different manner. Namely, this figure shows that four streams of media content, i.e., A, B, C, and D, are available for the user's selection. Assume that that client 1 selects media content corresponding to stream C. Further assume that client 2 is already receiving this content via channel Y. In response to the user's selection, client 1 accesses the discovery table 616 to discover the current usage activity of client 2. Then, the client 1 can tune to channel Y to receive the same content. However, if no other client is currently receiving the desired content, client 1 may send a request to the operations center 602, resulting in the receipt of the desired content over a potentially different channel, such as a channel X (which may be a channel that is dedicated to client 1).

The above-described implementation makes use of the discovery table 616 to alert clients to the content consumption activity of other clients. In an alternative implementation, a client propagates a tune event to the operations center 602 and, in response, the operations center 602 determines which channel the client should tune to in order to receive the desired content. In performing this task, the operations center 602 can determine whether any other client is currently receiving the desired content. The operations center 602 can then send a channel tune instruction down to the client. The channel tune instruction may command the client to remain on the channel that it is currently parked on. Alternatively the channel tune instruction may command the client to tune to another channel. In this implementation, the operations center 602 need not forward the discovery table 616 to the clients. (Nevertheless, to facilitate discussion, the remaining discussion will emphasize the implementation in which the operations center 602 does indeed send down the discovery table 616 to the clients.)

Figure 8:
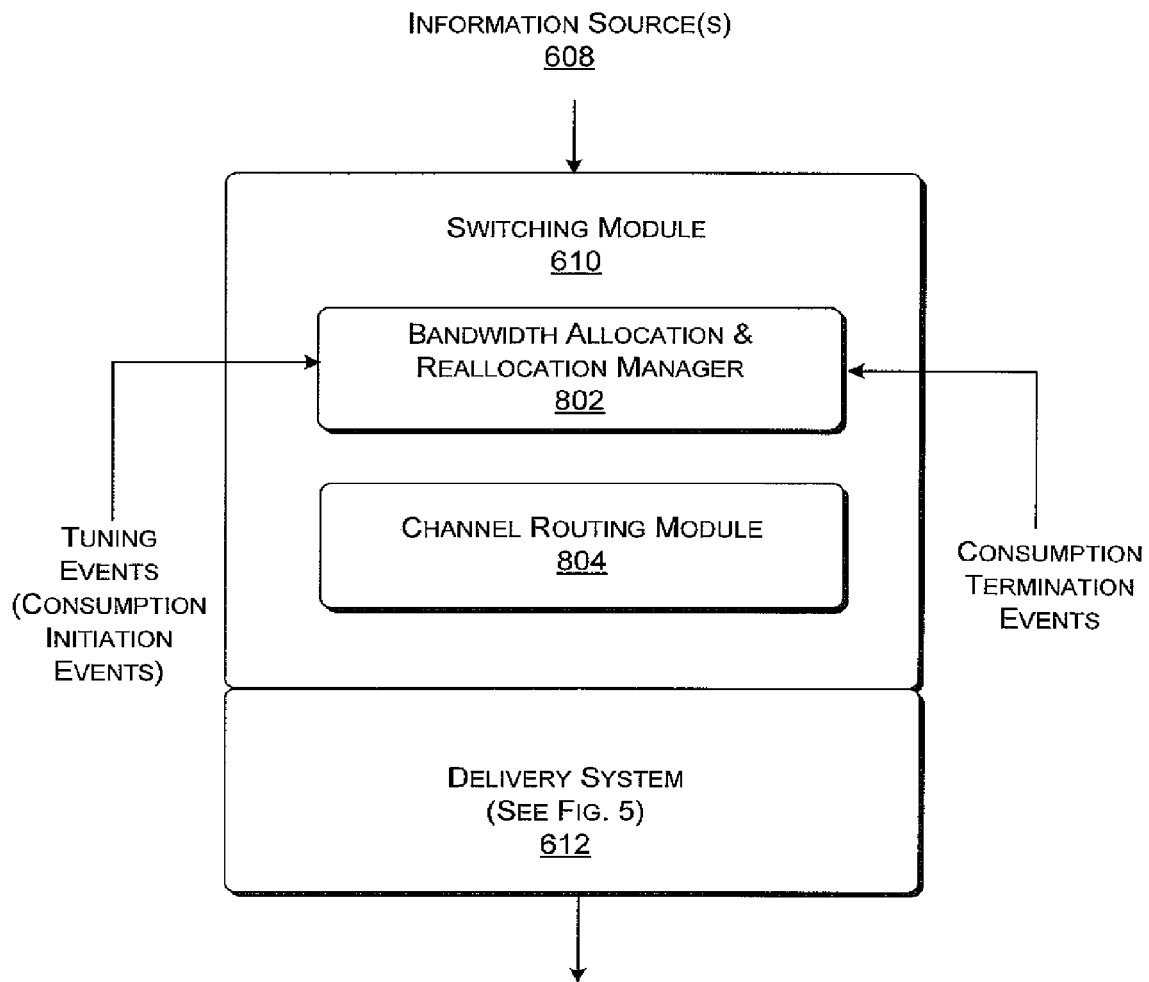
FIG. 8 shows exemplary components for use in an operations center of the system of FIG. 6.

FIG. 8 elaborates on one exemplary construction of the operations center 602. As explained above, the operations center 602 includes a switching module 610 and a delivery system 612. The purpose of the switching module 610 is to route content to clients which request this content and to manage the bandwidth used to send content to the clients. The purpose of the delivery system 612 is to perform all tasks associated with readying the media content for delivery over the pre-established communication infrastructure. As explained above, the functions performed by the switching module 610 and delivery system 612 can be organized in any fashion; to illustrate this point, FIG. 8 shows the switching module 610 as merged with the delivery system 612.

Considering the switching module 610 first, this module 610 may include a bandwidth allocation and reallocation manager 802, shortened to "bandwidth manager" for ease of reference. One function of the bandwidth manager 802 is to allocate media content to particular bandwidth slots in an available range of frequencies. According to the scenario described above, for instance, suppose, in a first case, that client A 604 is the first client to ask for particular content, such as a CNN network program. The bandwidth manager 802 may opt to allocate this content to a channel that is pre-assigned to client A 604. That is, in one implementation, the bandwidth manager 802 may assign client A 604 a dedicated or "home" channel in an initialization procedure. This provision enables client A 604 to access the content without performing a tuning operation. In other cases, the bandwidth manager 802 may assume a more liberal role in allocating content to channels, that is, by potentially assigning the content to any frequency slot that happens to be unused at the moment and/or based on one or more other considerations. In this latter scenario, the bandwidth manager 802 can send instructions to client A 604 that instruct it to tune to a specific channel.

The bandwidth manager 802 also serves a role in releasing bandwidth that is not currently being used by the system 600. To perform this function, the bandwidth manager 802 applies one or more rules to determine when a client is no longer using a channel. In performing this role, the bandwidth manager 802 may receive various consumption termination events from the clients (or from other components of the system 600). These events reflect the fact that portions of the bandwidth are no longer being actively used by a client.

According to a first solution, the bandwidth manager 802 registers when a client first tunes to a particular channel. The bandwidth manager 802 can then assume that the client is no longer actively consuming the content after a predetermined period of time has elapsed without receiving further input from the user. In one implementation, this time period can be fixed in advance, such as, but not limited to, a three or four hour time period. In another implementation, a system administrator can define the time period. In a variation of this concept, the bandwidth manager 802 can apply an empirically-computed and/or analytically-computed probability curve to assess the likelihood, as a function of time, that a user is no longer consuming media content. In another implementation, the bandwidth manager 802 can prompt each individual user to define the time period that will apply to each user's respective client. This prompting operation can be implemented using a special set-up user interface presentation (not shown). In still another implementation, the bandwidth manager 802 can query the user prior to dropping the delivery of content to a client. This query can give the user the option of manually overriding the bandwidth manager 802's decision to drop the content. In any of the these variations, the bandwidth manager 802 can reset the predetermined time period when it is detected that the user makes an input that is indicative of ongoing consumption of the content. Such an input can comprise a tuning event, a volume adjustment event, an EPG-related selection, a power on or off event, and so on.

According to another solution, each client device 802 can incorporate one or more sensors which detect the physical presence of a user in the proximity of the client. Such a sensor can be implemented as any kind of motion detector (such as an infrared motion detector). The bandwidth manager 802 can release content a predetermined time after a client's motion detector registers the presence of a user, providing that no further movement is detected.

According to another solution, some of the users (associated with respective clients) can be tasked with the responsibility of expressly indicating when they have stopped watching content. For example, these clients can include a input mechanism (such as a special user interface presentation) that solicits the users' input to indicate when the users have finished watching a particular content item, such as a particular movie. Or the users can be instructed to signal the termination of consumption by powering off their devices. These actions constitute empirical data that, when aggregated over a significantly large population of test clients, have a statistical bearing on the behavior of an entire population of users who are consuming the same media content. Thus, if a statistically significant sample of test users expressly indicate that they have stopped watching a movie at 10:05 PM, it may be assumed that other users who are watching the same content may have likewise stopped watching the movie at about the time. The bandwidth manager 802 can then make a decision to terminate delivery of media content to the entire pool of clients, or some subset thereof, based on the behavior of the test clients.

Still other strategies can be used to release media content based on an inference that users are no longer consuming this content. The above solutions are representative, rather than an exhaustive listing of implementations.

As another function, the bandwidth manager 802 can also create and update the discovery table 616. The discovery table 616 identifies the allocation of content (and associated channels) to client devices at a particular instance in time. The bandwidth manager 802 updates the discovery table 616 upon receiving a tune event from any client. After this updating, the bandwidth manager 802 propagates the updated discovery table 616 down to the clients. The clients can then subsequently use this discovery table 616 to determine whether any other client is currently receiving media content which they wish to also access.

As explained above, the downloading of the discovery table 616 represents just one possible way to implement the shared solution. In another technique, the switching module 610 can maintain a centrally-accessible master discovery table (not shown). Instead of sending copies of this table down to the clients, the system 600 can allow the clients to query the master table. If the master table indicates that a client is seeking to tune to media content that another client is already receiving, the switching module 610 can send a targeted instruction to the client which informs the client as to what channel it should tune to so as to receive the shared media content.

The bandwidth manager 802 can incorporate other special bandwidth managing features. Consider the case in which a user rapidly switches from one media content item to another, thereby exhibiting a behavior known as channel surfing. The above-described management of channel allocation involves several steps, thereby introducing some amount of latency when a client tunes to a new content item. This latency may manifest itself in an inability to properly present the content during the latency period. Thus, the user may experience non-optimal performance when changing channels, and especially when channel surfing. The latency, if unmitigated, may have the effect of slowing the user's advance through a series of content items.

One solution to this potential challenge is to delay initiation of the above-described shared channel processing for a predetermined time interval after a user has tuned to a new channel. For example, upon first tuning to media content, the operations center 602 can allocate a dedicated channel to the client to receive the content, regardless of whether another client is also receiving the same content over another channel. This channel provides a unicast transmission of the content because it is dedicated to a single client. Then, after the predetermined time has elapsed (which may be a few seconds) without registering another tune event, the client can initiate shared channel processing by accessing and examining the discovery table 616. Namely, the client determines whether the discovery table indicates that another client is receiving the same content over another channel. If so, the client device can abandon its unicast channel and then seamlessly transition to the media content being delivered over the other channel. To further reduce overhead, the switching module 610 can hold off updating the discovery table 616 until the user actually consumes the media content for the predetermined amount of time. This eliminates the need to download discovery tables 616 that reflect only transitory switching behavior, and thus which do not represent meaningful media consumption activity. A similar procedure can be performed in the above-described alternative implementation that does not make use of the discovery table 616. In this case, this procedure can reduce the number of channel tune traffic between the operations center 602 and the clients.

The bandwidth manager 802 can also include provisions for registering the content and/or the channel that a client was last tuned to when it was turned off. This allows the bandwidth manager 802 to assign the same content and/or channel to the client when the client is reactivated.

The purpose of the channel routing module 804 is to actually perform the switching operations identified by the bandwidth manager 802. This operation can be implemented using a switching fabric, e.g., composed of a collection of multiplexers.

The above-described protocol sets forth one general manner of operation of a shared switching model. Recall, however, that the network infrastructure may use a plurality of nodes to distribute media content to clients (e.g., note the use of nodes 320 in FIG. 3). In a multi-node infrastructure, the above-described switching operations can be distributed among the plural of nodes 320, such that each node group performs switching operations that affect only the clients in its group.

That is, first, when the user selects new media content, the client 604 registers a tune event. The client 604 sends the tune event to the switching module 610 via path 614. If no other client is currently receiving the desired media content, the switching module 610 routes the desired content to the client 604 via an appropriate channel. More specifically, this switching operation can involve sending a switching instruction and associated media content to the node group to which the client 604 belongs. The node group can then perform a local (i.e., group-specific) switching operation by selecting a channel to deliver the content, notifying the client 604 of the selected channel, and directing the desired media content to the client 604 over the selected channel. The node group can also send the discovery table 616 to all of the other clients in the node group via path 618. In the manner described above, other clients may subsequently rely on the table 616 to determine, upon another tune event, whether another client in the node group is currently receiving the desired media content. If so, the clients can immediately tune to the identified channel without undergoing the above-described interaction with the operations center 602. In the above implementation, the system 600 can use central switching functionality to manage channel allocations performed by the distributed set of node groups.

Now turning to the delivery system 316, although not shown, the delivery system 316 can include any one or more of the components illustrated in the case of FIG. 5, including a fast-tune module, a signal processing component, an IP-stripping module, and so forth.

The fast-tune module may optionally serve a modified role in the shared-channel context, such as by assisting in the expedited delivery of media content when a client device is the first client to access this content. In a shared context, the fast-tune module can also take some steps to expedite delivery. In one approach, similar to the channel surfing model described above, the operations center 602 can dedicate a unicast connection to a client when the client first tunes to media content. In this early stage, there are two redundant streams being sent, the unicast stream being sent to the new client and another stream being sent to one or more other clients that are already receiving the content. The operations center 602 can use any technique to provide quick delivery in the unicast stream, such as by providing this information at a higher bit rate than the existing stream. The operations center 602 can then orchestrate a seamless transition operation, in which the newly admitted client abandons the unicast stream and joins the multicast stream.

In another approach, the operations center 602 can achieve fast-tuning by potentially relaxing some of the processing constraints that govern when the client can start decoding received media content. This may allow a client device to decode shared media content as soon as possible, albeit with some possible reduction in quality. For example, if a normal protocol is to require the client to receive two I frames before it starts presenting output to the user, this constraint can be relaxed by allowing output upon the receipt of a single I-frame or based on some other compromise that may sacrifice quality.

A.3. Exemplary Functionality for Implementing the Operations Center

FIG. 9 sets forth exemplary processing functionality 902 that can be used to implement any aspect of the operations centers (302, 602). In one case, the operations centers (302, 602) can be implemented by one or more server-type computers, and FIG. 9 describes the exemplary composition of a server-type computer. The processing functionality 902 can be located at a single head-end site and/or spread over plural nodes.

The processing functionality 902 can include various volatile and non-volatile memory, such as RAM 904 and ROM 906, as well as one or more central processing units (CPUs) 908. The processing functionality 902 can perform various operations identified above when the CPU 908 executes instructions that are maintained by memory (904, 906). The processing functionality 902 also optionally includes various media devices 910, such as a hard disk module, an optical disk module, and so forth.

The processing functionality 902 also includes an input/output module 912 for receiving various inputs from the user (via input devices 914), and for providing various outputs to the user (via output devices 916). The processing functionality 902 can also include one or more network interfaces 918 for exchanging data with other devices via one or more communication conduits (e.g., networks). One or more communication buses 920 communicatively couple the above-described components together.

A.4. Exemplary Functionality for Implementing a Client

Figure 10:
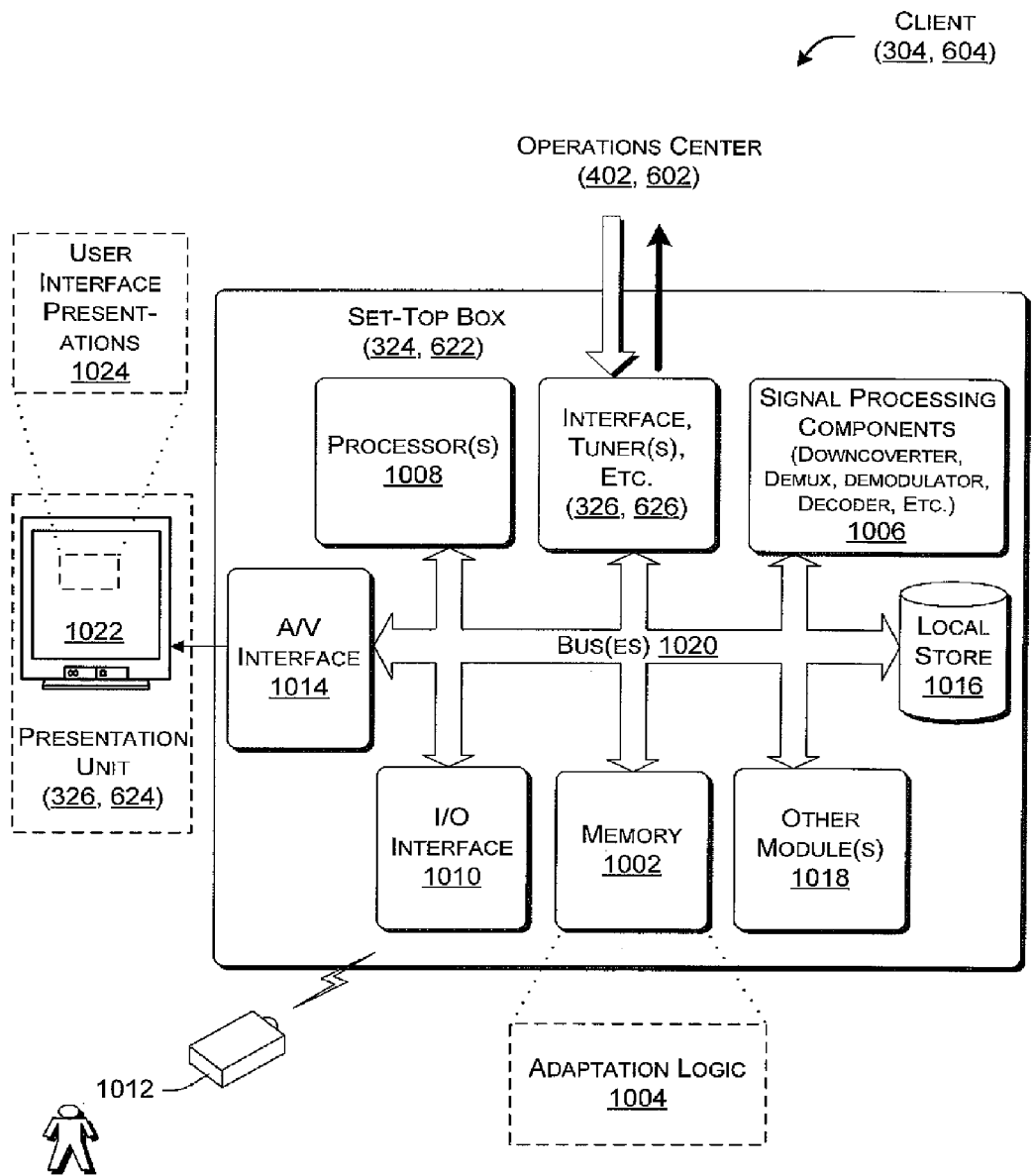
FIG. 10 shows exemplary client functionality that can be used to implement any aspect of the clients of FIGS. 3 and 6.

FIG. 10 provides additional details regarding the representative clients (304, 604) for use in the systems (300, 600) of FIGS. 3 and 6, respectively. To review, the clients (304, 604) can comprises set-top boxes (324, 622) coupled to presentation units (326, 624). Instead of set-top boxes (324, 622), the clients (304, 604) can be implemented as other types of processing devices, such as computer devices, DVRs, etc.

The set-top boxes (324, 622) can include a number of modules for performing their ascribed tasks. To begin with, the set-top boxes (324, 622) include an interface module (328, 626) in conjunction with tuners. The purpose of this module (328, 626) is to interface with the delivery networks (322, 620) and tune to a specified channel. The tuner may comprise a conventional band pass filter that extracts a signal at an identified frequency.

The set-top boxes (324, 622) also include memory 1002. A portion of the memory 1002 can be used to store instructions that tailor an otherwise conventional set-top box for use in the unique hybrid context shown in FIGS. 3 and 6. Namely, the memory can include 1004 adaptation logic 1004, which may constitute a software patch. This logic 1004 can include functionality which, in the first solution, instructs the set-top box 324 to remain fixed on an assigned channel, whereupon the operations center 302 performs content-switching on behalf of the set-top box 324 in response to a tune event. The adaptation logic 1004 can include, in the exemplary case of the shared solution, logic which instructs the set-top box 622 to receive the discovery table 616 and then to investigate this discovery table 616 before making a request to the operations center 602 upon a tune event. In another case, as explained above, the task of investigating shared channels can be performed at the head-end, in which case the clients receive channel tune instructions sent by the head-end. This solution does not use a downloaded discovery table 616.

The set-top boxes (324, 622) also include various signal processing components 1006. These components 1006 complement the operations performed by the operations centers (302, 602) in the server-side delivery systems (316, 612). The signal processing components 1006 can include a down-converter (to decrease the frequency of the received signal), a demultiplexer (to separate the individual components of the received signal), a demodulator (to remove the QAM modulation of the signal), a decoder (to interpret the underlying MPEG data in the received signal), and so forth.

The set-top boxes (324, 622) can also include one or more processors 1008 for executing instructions to implement the functionality of the set-top boxes (324, 622).

The set-top boxes (324, 622) can also include an I/O interface 1010 for interacting with the user via one or more input devices, such as a remote controller 1012, a personal computer (not shown), a joy stick (not shown), a voice recognition mechanism (not shown), and so forth.

The set-top boxes (324, 622) also include an A/V interface module 1014 for providing media information in an appropriate format to the presentation units (326, 624).

The set-top boxes (324, 622) also optionally include a local store 1016 for storing various data, such as, in the shared solution, the downloaded discovery table 616.

Finally, the set-top boxes (324, 622) can include various other modules 1018, not specifically identified by name in the figure. For instance, the set-top boxes (324, 622) can include a graphics compositor for combining a video component of the media content with graphics information. The graphics information may comprise various user interface presentations which are overlaid on the media information.

One or more busses 1020 can communicatively couple the above-identified components together.

The presentation units (324, 624) can comprise any kind of device for presenting AV information, including a CRT-type device, an LCD-type device, and so forth. In any case, the presentation units (324, 624) define a display surface 1022.

The set-top boxes (324, 622) can present one or more user interface presentations 1024 on the display surface 1022.

B. Exemplary Method of Operation

FIGS. 11-15 describe the operation of the systems (300, 600) in flowchart form. Namely, FIGS. 11 and 12 describe the above-explained non-shared solution, while FIGS. 13-15 describe the shared solution. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in prior sections, Section B will serve primarily as a review of those functions.

B.1. Exemplary Procedures for Implementing Non-Shared Solution

Figures 11, 12:
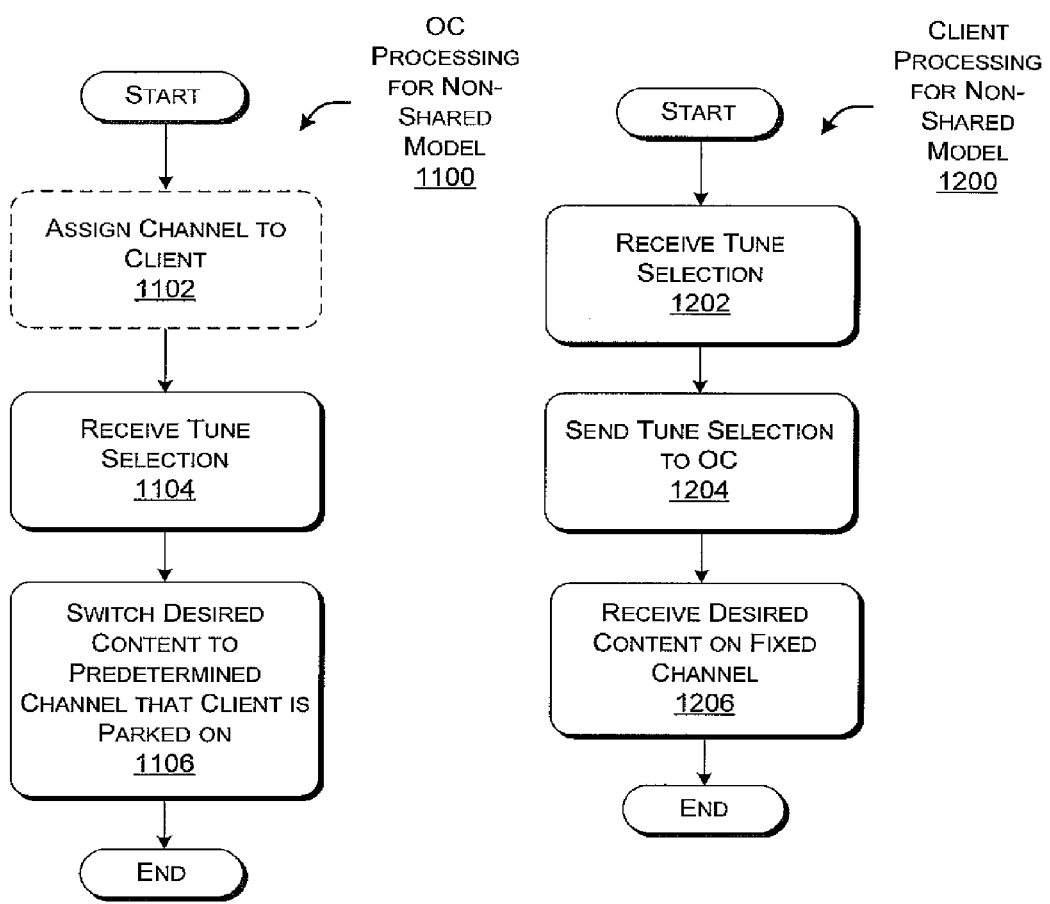
FIGS. 11 and 12 illustrate one exemplary manner of operation of the system shown in FIG. 3, corresponding to the non-shared model.

FIGS. 11 and 12 set forth the above-explained non-shared solution for presenting media content to clients. The solution is non-shared because, even though two or more clients are accessing the same media content, the operations center 302 allocates separate channels to each respective client.

FIG. 11 shows a procedure 1100 which explains the non-shared solution from the standpoint of the operations center 302.

As a preliminary operation, in step 1102, the operations center 302 can assign a channel to the client 304. In one case, the operations center 302 performs this task during an initialization procedure. In another case, the operations center 302 can assign (or re-assign) a channel to the client 304 in response to any kind of post-initialization event.

In step 1104, the operations center 302 receives a user's tune selection or an automatic tune selection (e.g., an automatic DVR or VOD tune selection). The user's tune selection represents a user's instruction to tune to desired media content. For purposes of discussion, assume that the client that generates this tune event is the representative client 304.

In step 1106, the operations center 302 switches the desired media content to the channel that is pre-assigned to the requesting client 304 in step 1102. This allows the client 304 to receive the desired media content without having to perform client-side tuning to extract the desired media content from the broadcast signal.

FIG. 12 shows a procedure 1200 which explains the non-shared solution from the standpoint of the representative client device 304.

In step 1202, the client 304 receives a media content selection, which may comprise the user's input via a channel selection mechanism, such as a remote control device (e.g., device 1012 of FIG. 10), or an automatic tune selection.

In step 1204, the client 304 sends a tune event to the operations center 302 associated with the content selection.

In step 1206, the client 304 receives the desired content over its assigned channel without having to perform client-side tuning to extract the desired content (because the client 304 is presumably already tuned to the pre-assigned channel).

B.2. Exemplary Procedures for Implementing Shared Solution

Figure 13:
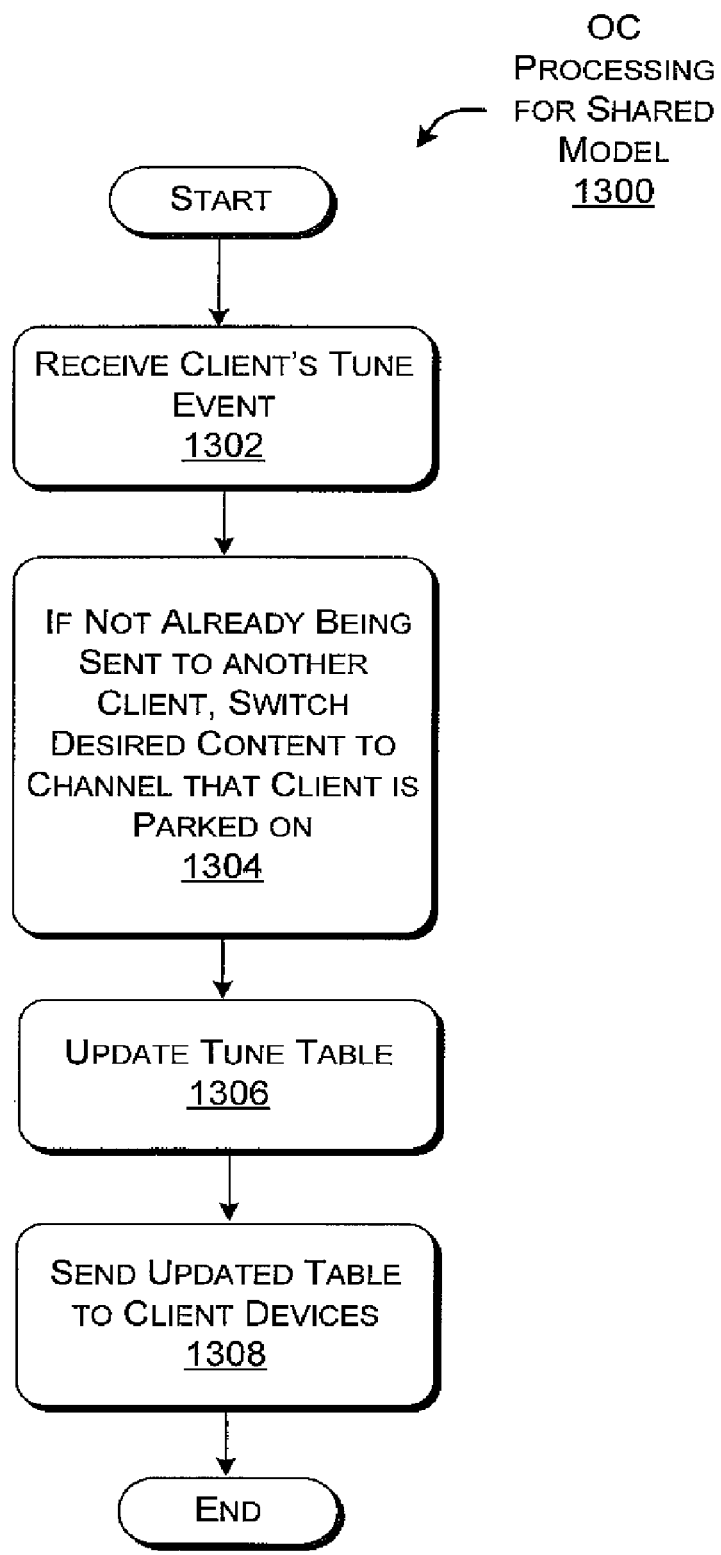
FIGS. 13-15 illustrate one exemplary manner of operation of the system shown in FIG. 6, corresponding to the shared model.
Figure 14:
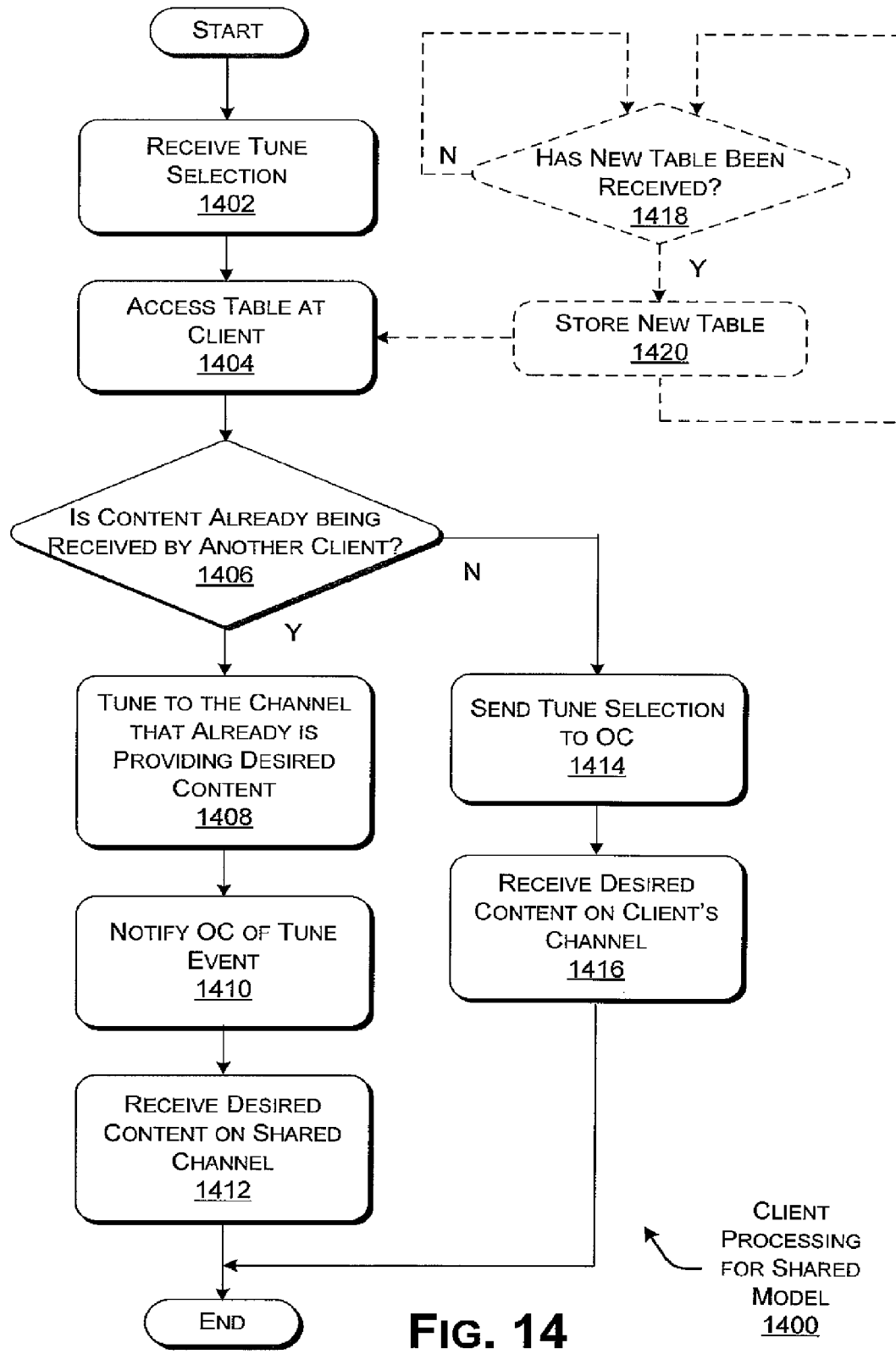
Figure 15:
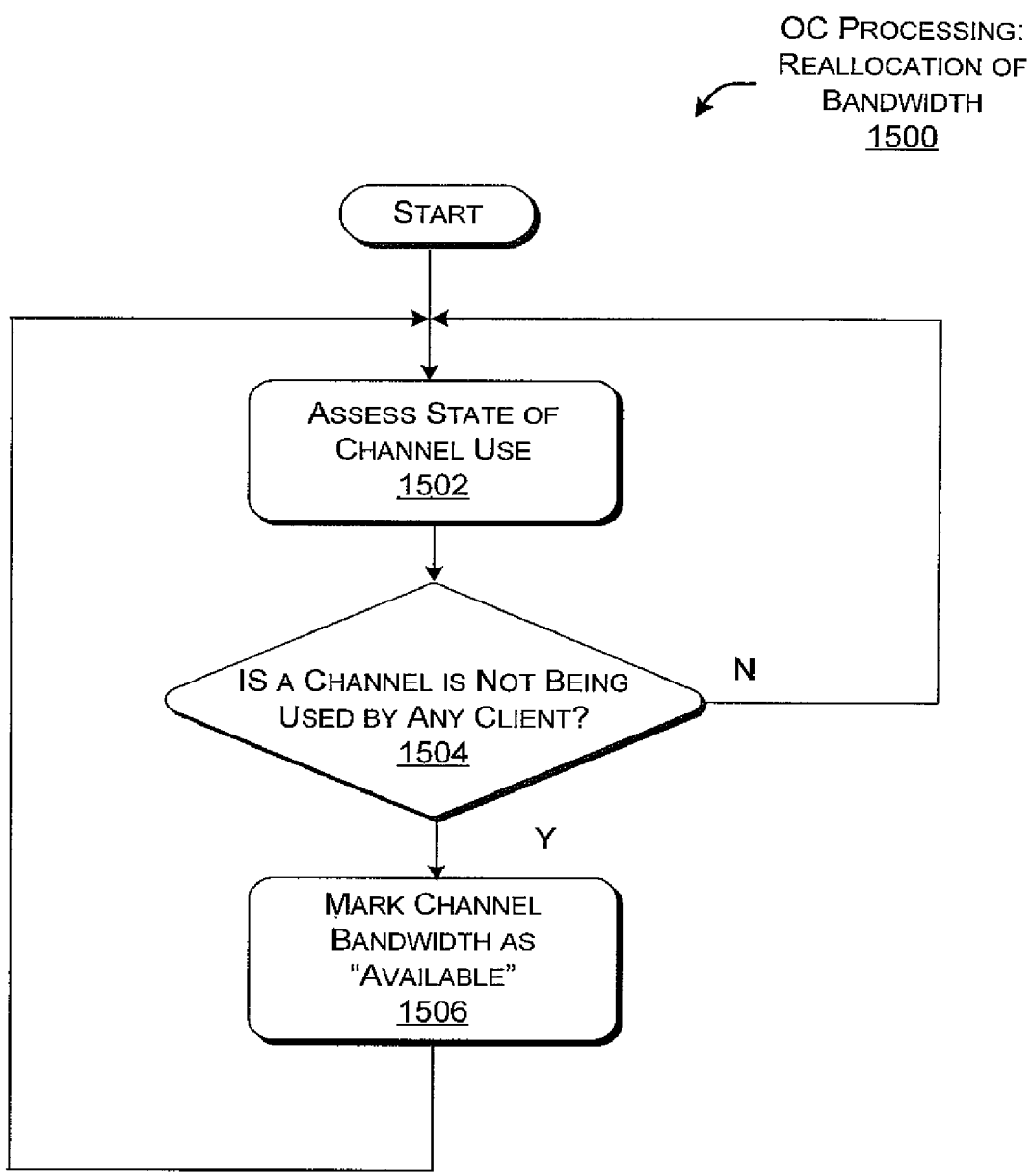

FIGS. 13-15 set forth the above-explained shared solution for presenting media content to clients. The solution is shared because two or more clients that are accessing the same media content can access this content via the same channel.

To begin with, FIG. 13 shows a procedure 1300 which explains the shared solution from the standpoint of the operations center 602.

In step 1302, the operations center 602 receives the client's tune event, indicating that the user (or automated functionality) wishes to receive desired media content. For purposes of discussion, assume that the client that generates this tune event is representative client 604.

In step 1304, providing that the operations center 602 is not already supplying the desired content to another client (or clients), the operations center 602 switches the desired content to an appropriate channel. As indicated in step 1304, this operation may be implemented by routing the desired content to a channel that is pre-assigned to the client 604. In another case, the operations center 602 may perform more complex bandwidth management and decide to send the client 604 the desired content on another channel, in which case the operations center 602 can instruct the client 604 to tune to this prescribed channel.

Alternatively, if the client 604 determines that another client is already receiving the desired media content, then the client 604 can locally switch to the channel that is already being used to deliver the desired media content. (This operation is more fully described in the context of FIG. 14.) In this case, the operations center 602 need not separately route the desired media content to the client 604.

In step 1306, the operations center 602 updates the discovery table 616 in response to the tune event. This operation may be performed regardless of whether the operations center 602 plays a role in newly routing the desired content to the client 604.

In step 1308, the operations center 602 downloads the updated discovery table 616 to all of the clients, giving the clients the ability to determine current content consumption in the system 600.

In an alternative case, the operations center 602 may forestall the operations of steps 1306 and 1308 until a predetermined amount of time has passed. This prevents operations center 602 from inundating the clients with updated discovery tables 616 when the user is merely quickly sequencing through content items in a channel-surf mode of operation. That is, only when the user remains on media content for a prescribed amount of time does the operations center 602 perform the channel updating and transmission operations of steps 1306 and 1308.

FIG. 14 shows a procedure 1400 which explains the shared solution from the standpoint of the client device 604.

In step 1402, the client 604 receives the user's media content selection, e.g., in response to a channel change instruction, etc.

In step 1404, the client 604 accesses the discovery table 616, which reveals what content the clients in the system 600 are currently consuming.

In step 1406, the client 604 determines, based on the discovery table 616, whether another client is currently receiving the same media content that the client 604 wishes to receive.

In step 1408, if another client is indeed receiving the same media content, then the client 604 tunes to the channel on which that other client is currently receiving the media content.

In step 1410, the client 604 notifies the operations center 602 of the tune event. This allows the operations center 602 to keep apprised of what content is being consumed in the system 600, and thereby update the discovery table 616.

In step 1412, the client 604 receives content via the shared communication channel that it tuned to in step 1408.

Alternatively, if the client 604 determines that no other client is currently consuming the desired media content, in step 1414, the client 604 can send a tune request to the operations center 602. This part of the procedure is the same as the first solution.

In step 1416, the client 604 receives the desired media content via a channel that is pre-assigned to the client 604, or through another channel.

Finally, in parallel with the above-described operations, steps 1418 and 1420 indicate that the client 604 is constantly determining whether an updated discovery table 616 is being sent by the operations center, and, if so, storing this discovery table 616. The operations center 602 sends an updated discovery table 616 when any client notifies it of a tune event (or at least a tune event that does not reflect merely channel surfing behavior).

The above procedures correspond to the case in which the clients determine the existence of shared content using the discovery table 616. But as stated above, the operations center 602 can check for shared content and then, in response to this checking, send channel tune instructions to the clients. This implementation can dispense with the use of the discovery table 616.

FIG. 15 shows a procedure 1500 that describes how the operations center 602 can reallocate bandwidth when the clients are no longer utilizing a particular channel.

In step 1502, the operations center 602 assesses a state of channel use in the system 600. This operation can be performed in various ways identified above with respect to FIG. 8.

In step 1504, the operations center 602 makes a determination, based on the state of channel use, whether a channel is not being used.

In step 1506, if step 1504 is answered in the affirmative, the operations center 602 can mark the unused channel as available. This allows this unused channel to be freed up to be reused.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention. Further, identification of one or more needs in the relevant art(s) does not suggest that the subject matter described herein is limited to solving these needs; the subject matter may address additional needs.

Further, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented in an operation center for delivering media content to a client, comprising:
   assigning, by the operation center, a channel to the client;
   receiving, by the operation center, a tune event from the client which indicates an instruction to receive desired media content of another channel that is different from the channel to which the client is assigned and to which a tuner of the client is tuned;
   switching, by the operation center, the desired media content from the other channel to the assigned channel such that the desired media content is deliverable over the assigned channel and such that the tuner of the client remains tuned to the assigned channel while receiving the switched, desired media content; and
   delivering, by the operation center, the desired media content to the client over the assigned channel, wherein the delivering takes place over a delivery infrastructure and delivery format developed for delivering media content items to clients over a plurality of channels associated with respective media content items, with an expectation that the clients receive the media content items by locally tuning to appropriate channels associated with the respective media content items, the local tuning generating tuning events but not changing a channel to which the tuner is tuned.

2. The method of claim 1, wherein the delivery infrastructure includes a combination of coaxial cables and fiber optic cables.

3. The method of claim 1, wherein the client includes a cable system set-top box.

4. The method of claim 1, wherein the client is programmatically configured to remain fixed to the assigned channel, although initially developed to selectively receive other channels in response to tune events.

5. The method of claim 1, wherein the switching uses Internet Protocol technology.

6. The method of claim 1, wherein the delivering further comprises expediting the delivery of the desired media content after the tune event is generated.

7. The method of claim 1, further comprising:
   determining whether another channel is currently assigned to the desired media content in a node group associated with the client; and
   allowing the client to receive the desired media content via that other channel if the determining is answered in the affirmative.

8. A non-signal computer-readable medium comprising:
   a plurality of executable instructions stored on the computer-readable medium, the executable instructions configured to program a switching device to perform operations including:
   assigning a channel to a client;
   receiving a tune event from the client which indicates an instruction to receive desired media content of another channel that is different from the channel to which the client is assigned and to which a tuner of the client is tuned;
   switching the desired media content from the other channel to the assigned channel such that it is deliverable over the assigned channel and such that the tuner of the client remains tuned to the assigned channel while receiving the switched, desired media content; and
   delivering the desired media content of the other channel to the client over the assigned channel, wherein the delivering takes place over a delivery infrastructure and delivery format developed for delivering media content items to clients over a plurality of channels associated with respective media content items, with an expectation that the clients receive the media content items by locally tuning to appropriate channels associated with the respective media content items, the local tuning generating tuning events but not changing a channel to which the tuner is tuned.

9. The non-signal computer-readable medium of claim 8, wherein the delivery infrastructure includes a combination of coaxial cables and fiber optic cables.

10. The non-signal computer-readable medium of claim 8, wherein the client is a cable system set-top box.

11. The non-signal computer-readable medium of claim 8, wherein the client is programmatically configured to remain fixed to the assigned channel, although initially developed to selectively receive other channels in response to tune events.

12. The non-signal computer-readable medium of claim 8, wherein the switching device is configured to use Internet Protocol technology in performing switching.

13. The non-signal computer-readable medium of claim 8, further comprising a fast-tune module configured to expedite the delivery of the desired media content after the tune event is generated.

14. A system for delivering media content to a client, comprising:
- a processor;
- memory;
- an operations center, comprising:
  - a switching module, stored in the memory and executing on the processor, configured to:
    - receive a tune event from the client which indicates an instruction to receive desired media content of another channel that is different from a channel to which the client is assigned and to which a tuner of the client is tuned; and
    - switch the desired media content from the other channel to the assigned channel such that it is deliverable over a channel assigned to the client and such that the tuner of the client remains tuned to the assigned channel while receiving the switched, desired media content; and
  - a delivery module, stored in the memory and executing on the processor, configured to transmit the desired media content of the other channel over the assigned channel;
- the client configured to tune to the assigned channel using a tuner of the client and to receive the desired media content over the assigned channel, which the client remains tuned to, the client being programmatically configured to remain fixed to the assigned channel, although initially developed to selectively receive other channels in response to tune events; and
- delivery infrastructure including a plurality of nodes, each node serving an assigned group of clients, the delivery infrastructure configured to deliver the desired media content to the client, wherein the delivery infrastructure is developed for delivering media content items to clients over a plurality of channels associated with respective media content items, with an expectation that the clients receive the media content items by locally tuning to appropriate channels associated with the respective media content items, the local tuning generating tuning events but not changing a channel to which the tuner is tuned,
- the delivery infrastructure further configured to determine whether another channel is currently assigned to the desired media content in a node group associated with the client and to allow the client to receive the desired media content via that other channel if the determining is answered in the affirmative.

15. The system of claim 14, wherein the delivery infrastructure includes a combination of coaxial cables and fiber optic cables.

16. The system of claim 14, wherein the client includes a cable system set-top box.

17. The system of claim 14, wherein the operations center is configured to use Internet Protocol technology in performing switching.

\* \* \* \* \*